United States Patent
Tal et al.

(10) Patent No.: US 8,401,545 B2
(45) Date of Patent: Mar. 19, 2013

(54) DROPPED CALL RE-ESTABLISHMENT SYSTEM WITH INTER-NETWORK CAPABILITES

(75) Inventors: Oren Tal, Tel-Aviv (IL); Reuven Tal, Tel-Aviv (IL)

(73) Assignee: On-Q Telecom Systems Co., Inc., Cheyenne, WY (US)

( * ) Notice: Subject to any disclaimer, the term of this patent is extended or adjusted under 35 U.S.C. 154(b) by 212 days.

(21) Appl. No.: 12/839,029

(22) Filed: Jul. 19, 2010

(65) Prior Publication Data

US 2011/0230184 A1 Sep. 22, 2011

Related U.S. Application Data

(60) Provisional application No. 61/315,076, filed on Mar. 18, 2010.

(51) Int. Cl.
*H04M 3/42* (2006.01)
*H04M 11/00* (2006.01)
*H04W 24/00* (2009.01)
*H04W 4/00* (2009.01)

(52) U.S. Cl. .............. 455/425; 455/414.1; 455/421; 455/423; 455/426.1; 455/466

(58) Field of Classification Search ............. 455/426.1
See application file for complete search history.

(56) References Cited

U.S. PATENT DOCUMENTS

| | | | |
|---|---|---|---|
| 6,058,303 A | 5/2000 | Astrom et al. | |
| 6,215,782 B1 | 4/2001 | Buskens et al. | |
| 6,246,872 B1* | 6/2001 | Lee et al. | 455/414.1 |
| 6,343,216 B1 | 1/2002 | Kim et al. | |
| 6,804,509 B1 | 10/2004 | Okon et al. | |
| 7,130,619 B2 | 10/2006 | Florky et al. | |
| 7,515,904 B2 | 4/2009 | Okon et al. | |
| 2003/0112948 A1 | 6/2003 | Brown et al. | |
| 2005/0043022 A1 | 2/2005 | Okon et al. | |
| 2007/0047695 A1 | 3/2007 | Tal et al. | |
| 2007/0121852 A1 | 5/2007 | Taylor et al. | |
| 2007/0167165 A1 | 7/2007 | Yang et al. | |
| 2007/0202895 A1 | 8/2007 | Benco et al. | |
| 2008/0020748 A1* | 1/2008 | Parker et al. | 455/423 |
| 2009/0143050 A1* | 6/2009 | Ignatin | 455/414.1 |
| 2009/0264123 A1 | 10/2009 | Bhushan et al. | |

FOREIGN PATENT DOCUMENTS

EP 0871316 1/2005
EP 2107817 10/2009

* cited by examiner

*Primary Examiner* — Charles N. Appiah
*Assistant Examiner* — Natasha Cosme
(74) *Attorney, Agent, or Firm* — Leason Ellis LLP

(57) ABSTRACT

In a communication system comprising multiple networks, a system is provided for re-establishing a dropped call, involving subscribers of possibly different networks, between a user A who has been unintentionally-disconnected from a communication network and a user B who is the other party to the call. The system includes a database, a detection task module, re-establishment task modules and a task manager module. The call is re-established after complete tear-down of the dropped call in both users' networks.

27 Claims, 21 Drawing Sheets

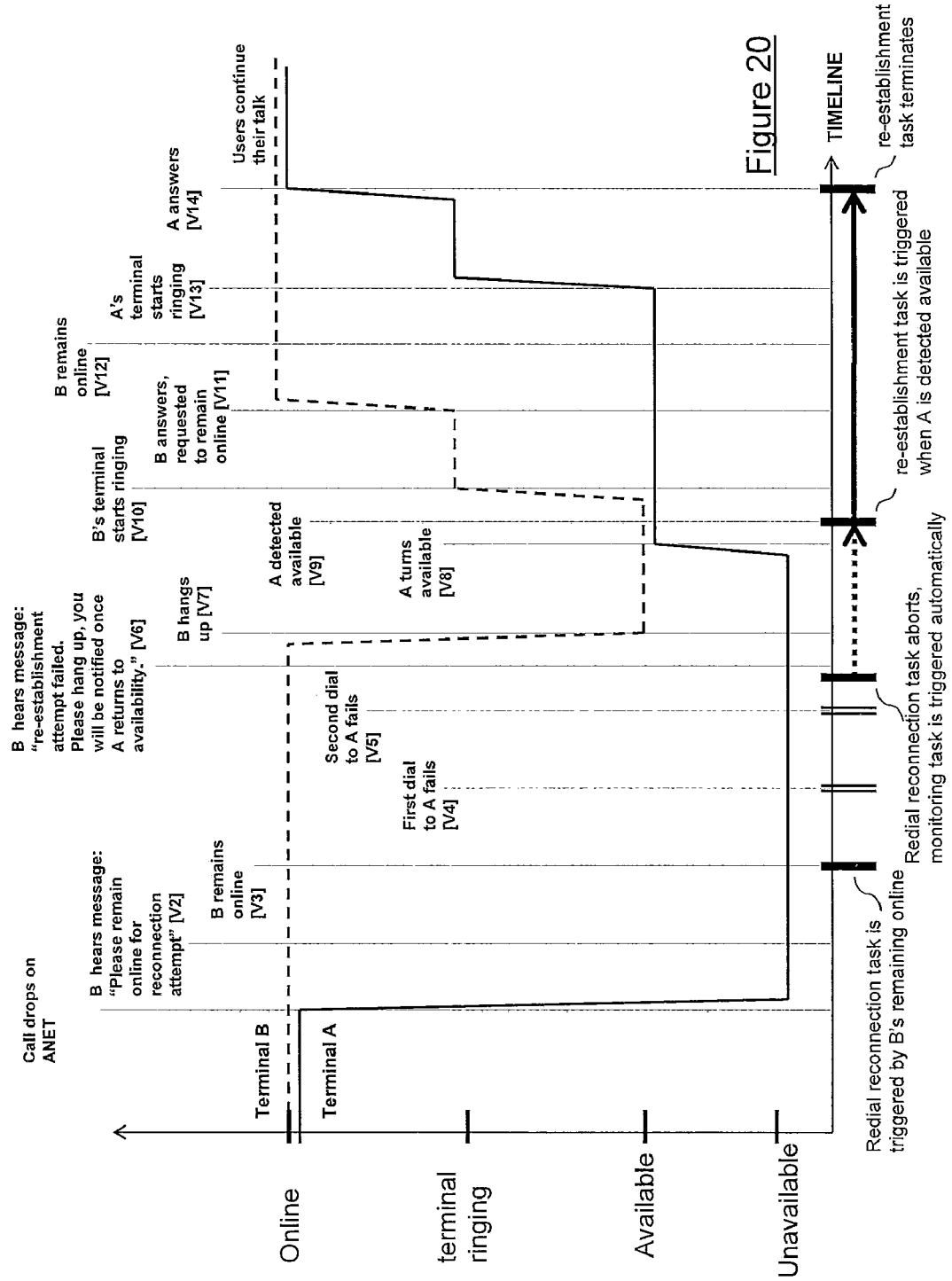

DROPPED CALL RE-ESTABLISHMENT SYSTEM WITH INTER-NETWORK CAPABILITES

Figure 1A:
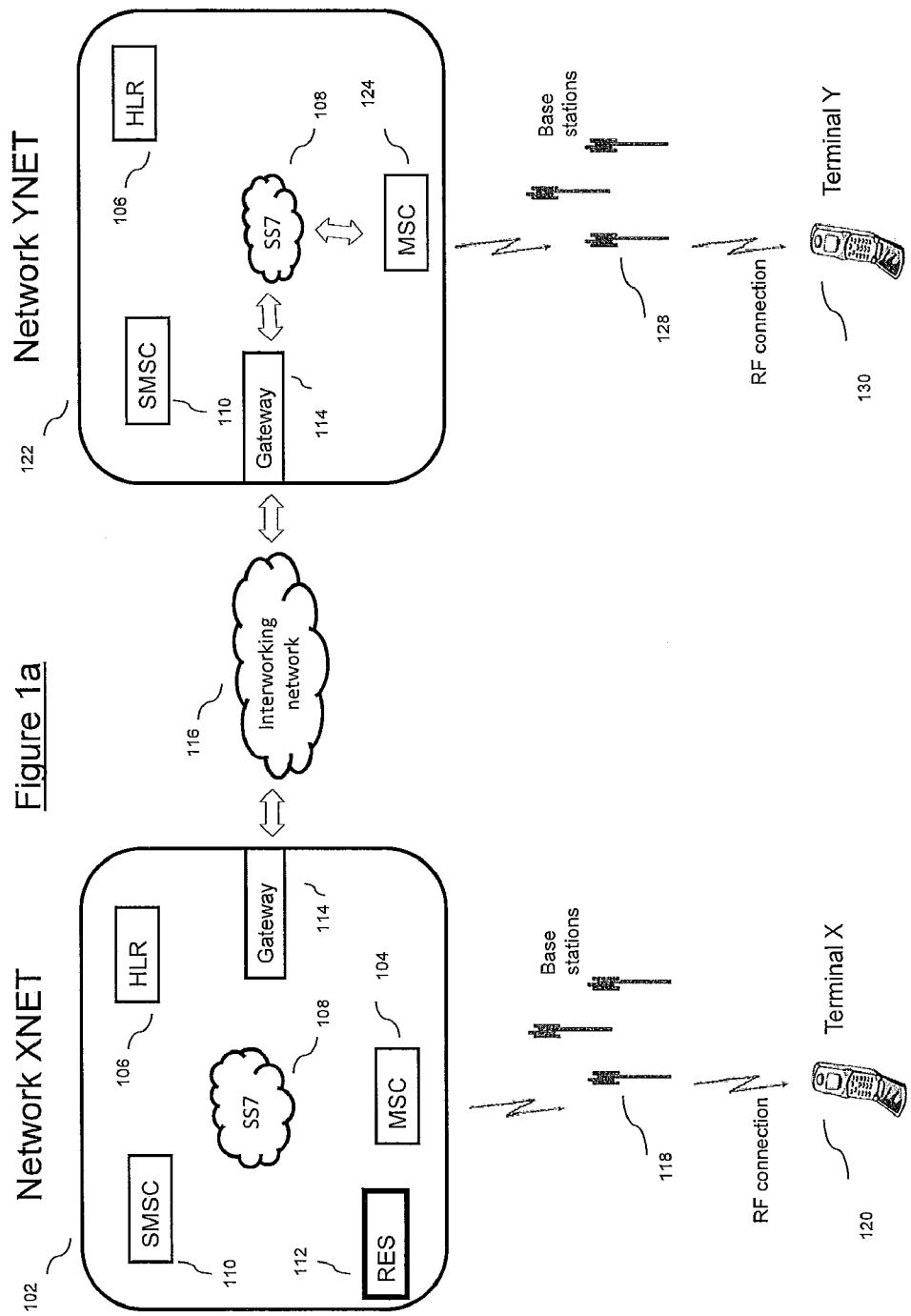

This application claims the benefit of priority from U.S. Provisional Application Ser. No. 61/315,076, filed on Mar. 18, 2010, entitled "Inter-Network Reconnection System," which is hereby incorporated by reference as if set forth in its entirety herein.

FIELD OF THE INVENTION

The present invention relates to communication systems and, more particularly, relates to dropped-call re-establishment systems and methods configured to re-establish communications between a caller and a call destination, including among subscribers of potentially different networks.

BACKGROUND OF THE INVENTION

Terminology

Modern mobile communication systems include a vast variety of technologies and standards such as cellular systems, WiFi, WiMax, and more. Even within the cellular systems family different standards exist such as GSM, CDMA, TDMA, IDEN. These systems and technologies are generally used to transfer two types of content—voice and data. The introduction of technologies such as voice over internet protocol (VoIP), in which both voice and data are transferred in packets, contributes to the delineation of voice and data transfer.

A basic element in every communication network is a dynamic database holding the current attributes of each terminal in the network, such as its availability, its location, its settings and its preferences. This database may be located in one physical machine or alternatively distributed across the network. In traditional cellular networks, HLR (Home Location Register) is the database holding the attributes of the network's own subscribers. In advanced communication networks, other types of databases and architectures may be utilized for keeping track of dynamic attributes of users that are registered or even just recognized by the network. For brevity and clearness, the descriptions hereinafter will use the traditional term "HLR" but it is to be understood that this term represents the much broader entities as described herein.

In addition, the convergence of the aforementioned technologies sometimes allows interoperability between technologies—for example, one side of a call can be e.g., a cellular terminal and the other e.g., a WiFi terminal. To make things more complicated, "hybrid" devices have been introduced that enable communicating between two mobile devices supporting two or more technologies, with an ability to transfer between communication technologies even in the course of a call. Therefore, what has traditionally been referred to as a "call" between two or more users using a wireline and/or mobile devices can presently be referred to as the much broader term of "communication session". Accordingly, the traditional act of "dialing" can now be referred to as the much broader "attempt to set-up a communication session". For brevity and clearness, the descriptions hereinafter will use the traditional terms such as "dial", "call", "calling", "caller", "destination", but it is to be understood that these terms represent the much broader entities as described herein.

According to the same line of logic, the traditional SMS message that was until not long ago an essentially sole method of transferring data between mobile devices has evolved into a vast variety of messages such as Multi-Media Messages (MMS) and instant messages (IM). In another example, data is delivered by a call that goes out to user and plays a recorded audio sign or statement. For brevity, the descriptions that follow will use the term "SMS" and this term is to be understood as a message in its broadest sense as elaborated herein, including the evolved incarnations noted above and that generally are part of a message service, whether or not an "SMS" in the traditional sense. Messages sent within certain types of messaging systems can be configured to trigger, when delivered at recipient's mobile device, a report informing the delivery and sometimes the time of delivery, which is sent back to the entity that had sent the message (human or other). This type of report will be hereinafter referred to as a "delivery report".

Hundreds of mobile operators exist around the world. Each operator operates its own communication equipment and infrastructure for supporting mobile communication of its subscribers. For a single operator, all these will be collectively referred to as a "network" entity. Noticeably, a network can combine two or more technologies, such as a cellular network combining CDMA and IDEN technologies. A call between users of two different operators will be hereinafter referred to as an "internetwork" call. Industry standards allow standard actions such as a call, an SMS and an instant message to be performed between users of different operators, or "interoperator".

For a connection to be established between two terminals, a "call setup" procedure has to take place. This typically commences with first user initiating a "call setup request" on his/her terminal. This request propagates from user's terminal to the serving network, and from there on to second user's serving network and, if possible, to second user's terminal. Second user can then decide whether to approve the call setup. In case second user approves, each network allocates certain resources at different network entities, e.g., switches and base stations. These resources support the connections that constitute the call, such as voice trunks and signaling resources. When the resource allocation procedure is successful in both networks then a call is established and users can commence the conversation. Notably, in each network, the resources allocated for a call are deducted from pools of respective resources available at the network, reducing the number of other connections that can be supported at any given instance. When a call terminates, at both networks a "call tear-down" procedure takes place which releases these resources to their respective pools.

Dropped Calls

Wireless communication systems are well known in which mobile units can initiate or receive calls while roaming between different radio frequency (RF) coverage areas (sometimes referred to as "cells"). The mobile units communicate via RF resources with base stations distributed among the cells, which base stations are controlled by one or more mobile switching centers (MSCs). The MSCs provide control signaling for the call and connect the mobile unit to other participating endpoints, which may comprise other mobile units or wireline units.

In general, a call between two users in a communication network is constituted by a plurality of connections between different network entities, such as connections between the users and their serving base stations and connections between base stations and their respective mobile switching centers (MSC's). If one of these connections is impaired during an active call, the call might be unintentionally-disconnected. A major cause for call disconnections is a loss or a severe degradation in one of the connections between users and base stations or base stations and switches. Occasionally, mobile units can encounter service interruption(s) during a call, for example, upon entering a tunnel or reaching a fringe RF coverage area or due to a handoff error, causing the mobile unit to become unintentionally disconnected from the serving network and terminating the call. This occurrence is hereinafter referred to as a dropped call. The user whose mobile unit has been unintentionally disconnected from his/her serving network will be hereinafter referred to "user A" and the other at least one user shall be hereinafter referred to as "user B".

Dropped calls are a major cause of dissatisfaction of cellular phone users and may ultimately cause the unsatisfied user to terminate his/her subscription with the network, or in other terms, churn. A method for re-establishing an unintentionally-terminated call is therefore highly desirable from the point of view of the user as well as of the network carrier. After a call has dropped, or "unintentionally disconnected", in many cases it would be much desired to resume the conversation that had been disrupted.

PRIOR ART

The references below teach various methods for reconnecting a dropped call. These methods attempt to enable users that have experienced a dropped call to resume their conversation. In these methods, the party that was not disconnected (hereinafter referred to as user B) remains online waiting for the disconnected party (hereinafter referred to as user A) to rejoin the connection. Some method's are transparent to users, i.e., users experience only a short interruption in the voice channel and then continue their respective calls, while other methods provide user B a voice notification prompting him/her to remain online for user A to rejoin the call. These services will be hereinafter referred to as "call reconnection" services.

U.S. Pat. No. 6,215,782 to Buskens at al. teaches a method for reconnecting calls affected by a loss of synchronization. After a call is disconnected, a time-out sequence is initiated during which reconnection attempts are performed. The time-out sequence can be incremented a number of times before reconnection attempts are terminated and the call is released. In a further embodiment, a mobile switching center and a serving base station may selectively determine whether reconnection attempts are to be made.

U.S. Pat. No. 6,343,216 to Kim at al. teaches an automatic dropped call reconnection method in a communication system. According to this method, the base station (BS) serving the terminal that has been disconnected informs the serving mobile switching center (MSC) of the service impediment, the MSC sends a reconnection paging request to a group of base stations and/or another MSC, and the latter attempts reconnecting with the disconnected terminal.

U.S. Pat. No. 7,130,619 to Florkey et al. teaches a method and system for whereby a mobile unit may initiate reconnection of an interrupted call by sending a mobile-originated reconnect (MORC) message into the network; or, conversely, the mobile unit may affirmatively decline a reconnect attempt by choosing not to send a MORC message (or, alternatively, by sending a reconnect decline message) within a designated waiting period. Responsive to the MORC message (or absence of MORC message), the network will conditionally attempt (or not attempt) to reconnect the call. In such manner, a method and system provide for a mobile unit affirmatively requesting or declining a reconnect attempt of a call, rather than relying on a network-initiated reconnect that may or may not occur; and for the network to reconnect a call without network-initiated pages.

Co-pending U.S. application Ser. No. 12/839,161 filed on even-date herewith, titled "Dropped Call Reconnection System with Inter-Network Capabilities", which is hereby incorporated by reference as if set forth in its entirety herein, teaches a method and system for reconnecting dropped calls between possibly different networks. In one arrangement according to the disclosure of that patent application, after the drop is detected user B is requested to remain online for a short period while several redial attempts are made to establish a new connection with user A. If a call gets through to user A's terminal and user A answers, users are bridged and may resume their conversation. (A complete understanding of the aforesaid co-pending application can be had from a review of that application.)

The main limitations of the call reconnection methods described above are as follow: First, call reconnection typically involves keeping user B online waiting for user A to rejoin. In many cases the renewed connection cannot occur within a short time which means that user B could end up holding the line in vain. Second, implementation typically requires extensive network installations and modifications. Several services even require installing a dedicated client application on each terminal Third, the reconnection services must be implemented by realtime modules which require, close integration with the network and high processing capabilities.

Accordingly, it would be an improvement in the art to facilitate the re-establishment of dropped calls between subscribers of possibly different operators. As such, a system in accordance with the invention, when installed in a network, will support re-establishment of dropped calls in which at least one user is a user of the network. Advantageously, such a system will also enable re-establishment of calls even after long periods of unavailability. Advantageously, both users involved in the dropped call can be notified that a previously-dropped call can be re-established, and can be provided a convenient option to re-establish the call using a system according to the invention. Advantageously, both users of the inventive system are informed of the service flow status to the maximum extent, so as to minimize premature dialing attempts. Advantageously, system implementation of the present invention in an existing network will not require extensive installations and modifications. The present invention is directed to addressing one or more of these needs, either as a system or a method.

SUMMARY OF THE INVENTION

In accordance with one aspect of the present invention, a method is provided for re-establishing an unintentionally-terminated call in a communication system as a result of a loss of one of a plurality of connections therebetween which constitute the call, comprising the steps of detecting that one connection of the call has been unintentionally-disconnected using a re-establishment system (RES) connected to a network associated with at least one of the parties to the call, the RES having a detection task module executing at least one detection task on a processor thereof and operative to receive the number identifications of the two parties, receive a release message associated with the call, said release message originating in an MSC of the network that initiated the call termination, the release message including one or more cause-indicators, parse the release message in a machine executing the RES to obtain the cause-indicator; test the cause-indicator parsed from the release message to determine a match to a prescribed criterion; and in the event of the match, executing a re-establishment task within the RES using a re-establishment task module, wherein the re-establishment task executes to dial user A, who is the party that has been unintentionally disconnected from the network, and to keep redialing for a predefined time limit until user A answers and wherein, if user A answers within the predefined time limit, then the re-establishment task performs the additional steps at the RES of dialing user B, who is the other party to the call, and if user B answers, bridging user A and user B.

In accordance with another aspect of the present invention, a method is provided for notifying that an unintentionally-terminated call in a communication system can be re-established, the termination being a result of a loss of one of a plurality of connections that constitutes the call, comprising the steps of detecting that one connection of the call has been unintentionally-disconnected using a re-establishment system (RES) connected to a network associated with at least one of the parties to the call, the RES having a detection task module executing a detection task on a processor thereof and operative to receive the number identifications of the two parties, receive a release message associated with the call, said release message originating in an MSC of the network that dropped the call, the release message including one or more cause-indicators, parse the release message in a machine executing the RES to obtain the cause-indicator, test the cause-indicator parsed from the release message to determine a match to a prescribed criterion and in the event of the match, executing a re-establishment task within the RES using the re-establishment task module, wherein the re-establishment task operates so as to periodically assess the availability of a user A, who is the party that has been unintentionally disconnected from the network, using data provided over the network for a predefined time limit until user A becomes available, and wherein, if user A becomes available within the predefined time limit, the re-establishment task performs the additional step at the RES of sending at least one of user A and a user B, who is the other party to the call, a notification that a new call can be established.

In accordance with yet another aspect of the present invention a re-establishment system (RES) is provided for re-establishing a call between a user A who has been unintentionally-disconnected from a communication network and a user B who is the other party to the call, the disconnection being a result of a loss of at least one of a plurality of connections between user A and user B which together constitute the call, wherein the RES is connected to the communication network and is associated with at least one of user A and user B, comprising a computer having a memory and a processor for executing modules therein, the computer being in communication with the communication network, a database, a detection task module loaded into the memory of the computer and executing at least one detection task in the processor, the detection task configuring the processor to cause the computer to load into the memory number identifications of user A and user B which are provided by the communication network, load into the memory a release message associated with the call which is provided by the communication network, the release message including one or more cause-indicators, parse the release message in the memory to obtain the cause-indicator and test the cause-indicator to determine a match to a prescribed criterion stored in the database; a re-establishment task module loaded into the memory of the computer and executing at least one re-establishment task in the processor in response to the test by the detection task returning the match, the re-establishment task configuring the processor to cause the computer to dial user A, monitor whether user A answers the call based on data provided by the communication network and if user A answers within a pre-defined time limit, then dial user B and if user B answers, bridging user A and user B; otherwise repeating the re-establishment task steps until the predetermined time limit has lapsed; and a task manager loaded into the memory of the computer and executing in the processor so as to configure the processor to monitor the execution of up to a multiplicity of detection tasks and re-establishment tasks.

In accordance with a further aspect of the present invention A system is provided for notifying that an unintentionally-disconnected call in a communication system between a user A who has been unintentionally-disconnected from a communication network and a user B who is the other party to the call can be re-established, the disconnection being a result of a loss of at least one of a plurality of connections between user A and user B which together constitute the call, wherein the system is connected to the communication network and is associated with at least one of user A and user B, comprising, comprising a computer having a memory and a processor for executing modules therein, the computer being in communication with the communication network, a database, a detection task module loaded into the memory of the computer and executing at least one detection task in the processor, the detection task configuring the processor to cause the computer to load into the memory number identifications of user A and user B which are provided by the communication network, load into the memory a release message associated with the call which is provided by the communication network, the release message including one or more cause-indicators, parse the release message in the memory to obtain the cause-indicator and test the cause-indicator to determine a match to a prescribed criterion stored in the database; a re-establishment task module loaded into the memory of the computer and executing at least one re-establishment task in the processor, the re-establishment task configuring the processor to cause the computer to periodically assess the availability of a user A using data provided over the communication network for a predefined time limit until user A becomes available dial user A, monitor whether user A answers the call based on data provided by the communication network and if user A answers within a predefined time limit, then dialing user B and if user B answers, bridging user A and user B, otherwise, repeating the re-establishment task steps until the predetermined time limit has lapsed; and a task manager loaded into the memory of the computer and executing in the processor so as to configure the processor to monitor the execution of up to a multiplicity of detection tasks and re-establishment tasks.

These and other aspects, features, and advantages of the present invention, some of which are detailed in the claims attached hereto, can be further appreciated from the following discussion of certain embodiments of the invention taken together with the drawing figures that illustrate the embodiments thereof.

BRIEF DESCRIPTION OF THE DRAWING FIGURES

FIG. 1a provides a block-diagram description of an Re-establishment System (RES) installed in a communication system and serving it.

Figure 1B:
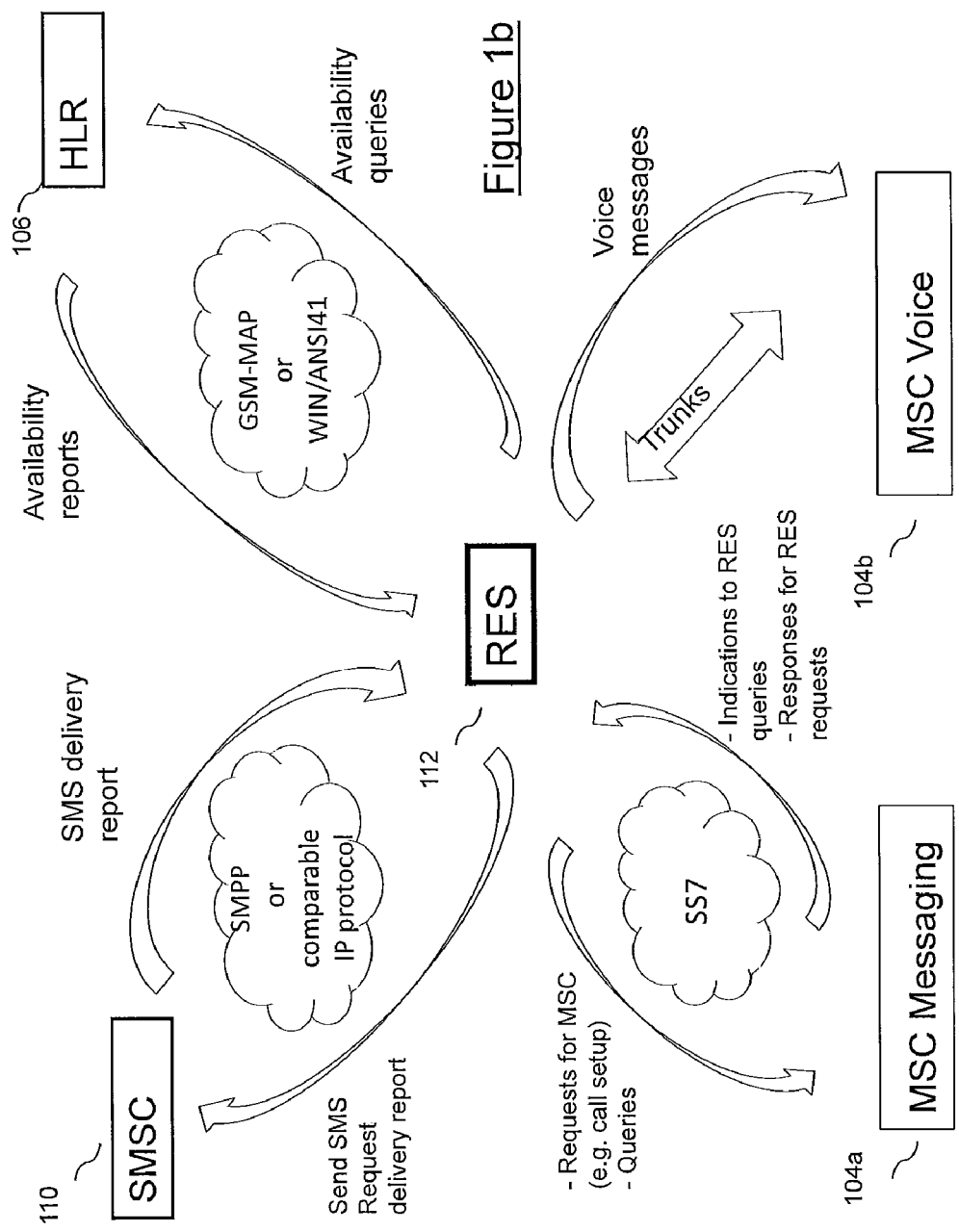

FIG. 1b provides a schematic description the connectivity of the RES system with several important external modules.

Figure 2:
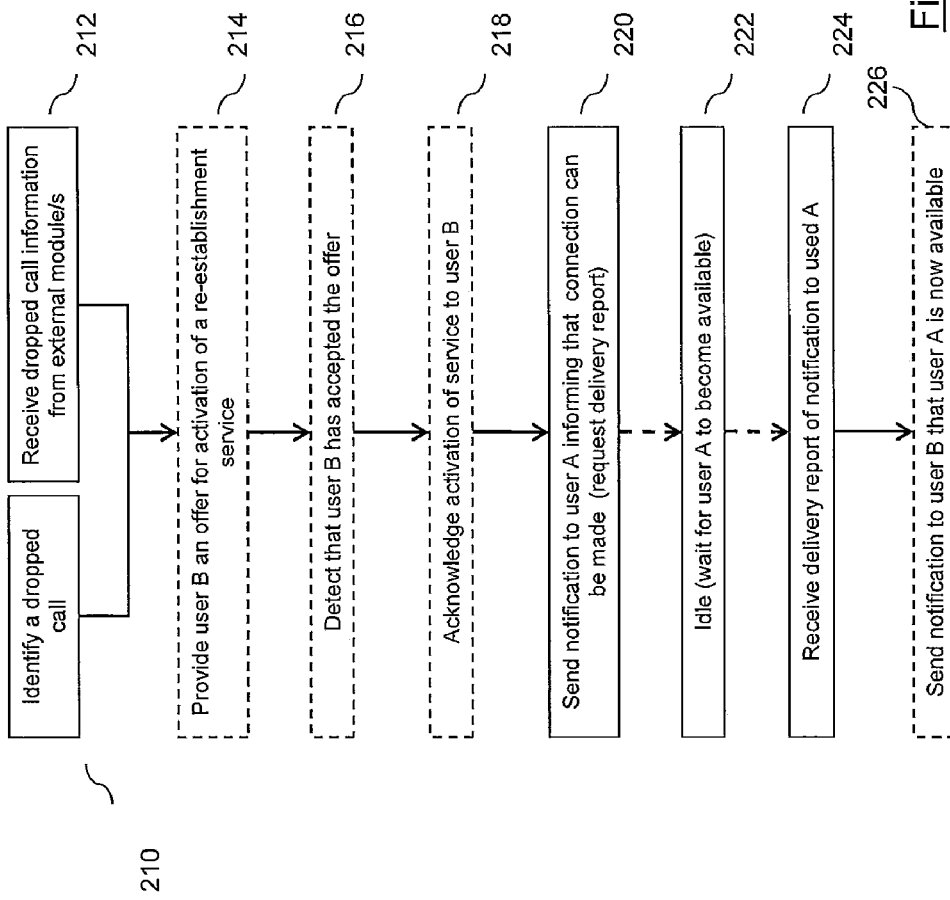

FIG. 2 provides a schematic description of the stages performed by the RES for each occurrence of a dropped call, according to the SMS-based embodiment.

Figure 3:
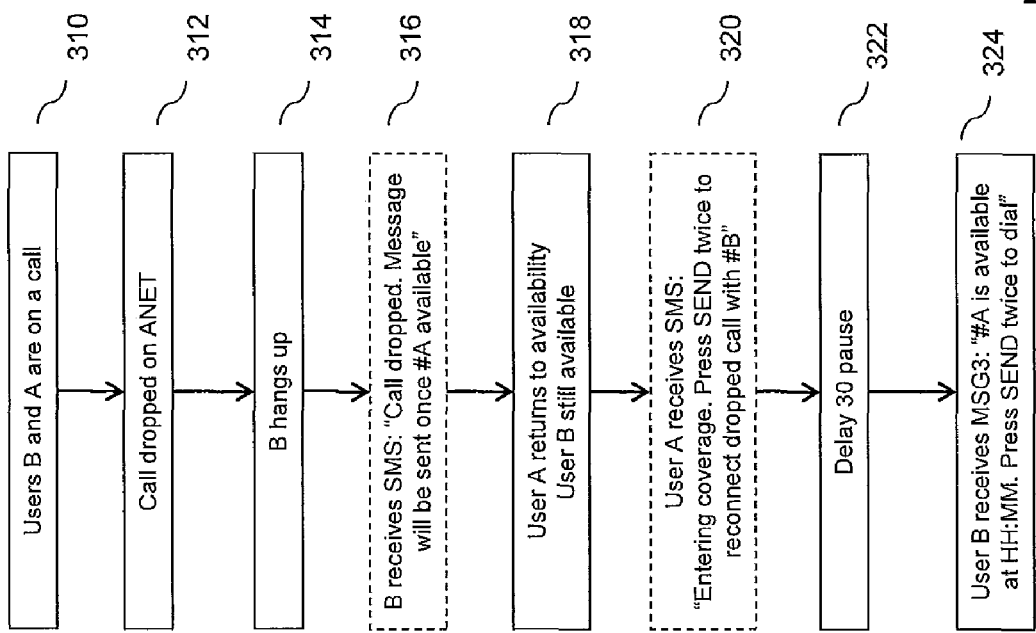

FIG. 3 provides a schematic description of the stages performed by the RES for each occurrence of a dropped call from the RES, according to the SMS-based embodiment with automatic triggering.

Figure 4:
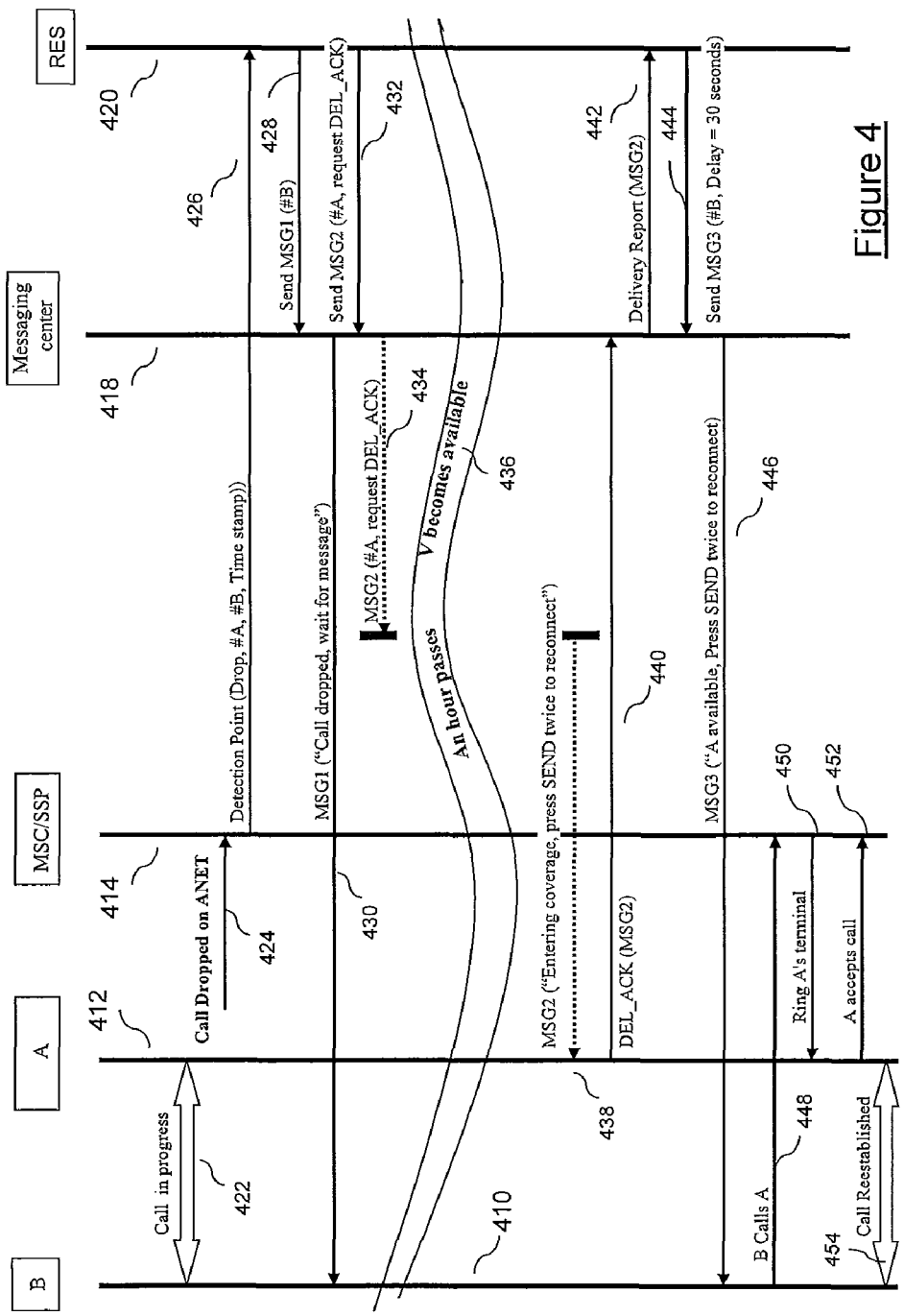

FIG. 4 provides a schematic description of the data flow between terminals and network entities according to the SMS-based embodiment with automatic triggering, with a first ending scenario.

Figure 5:
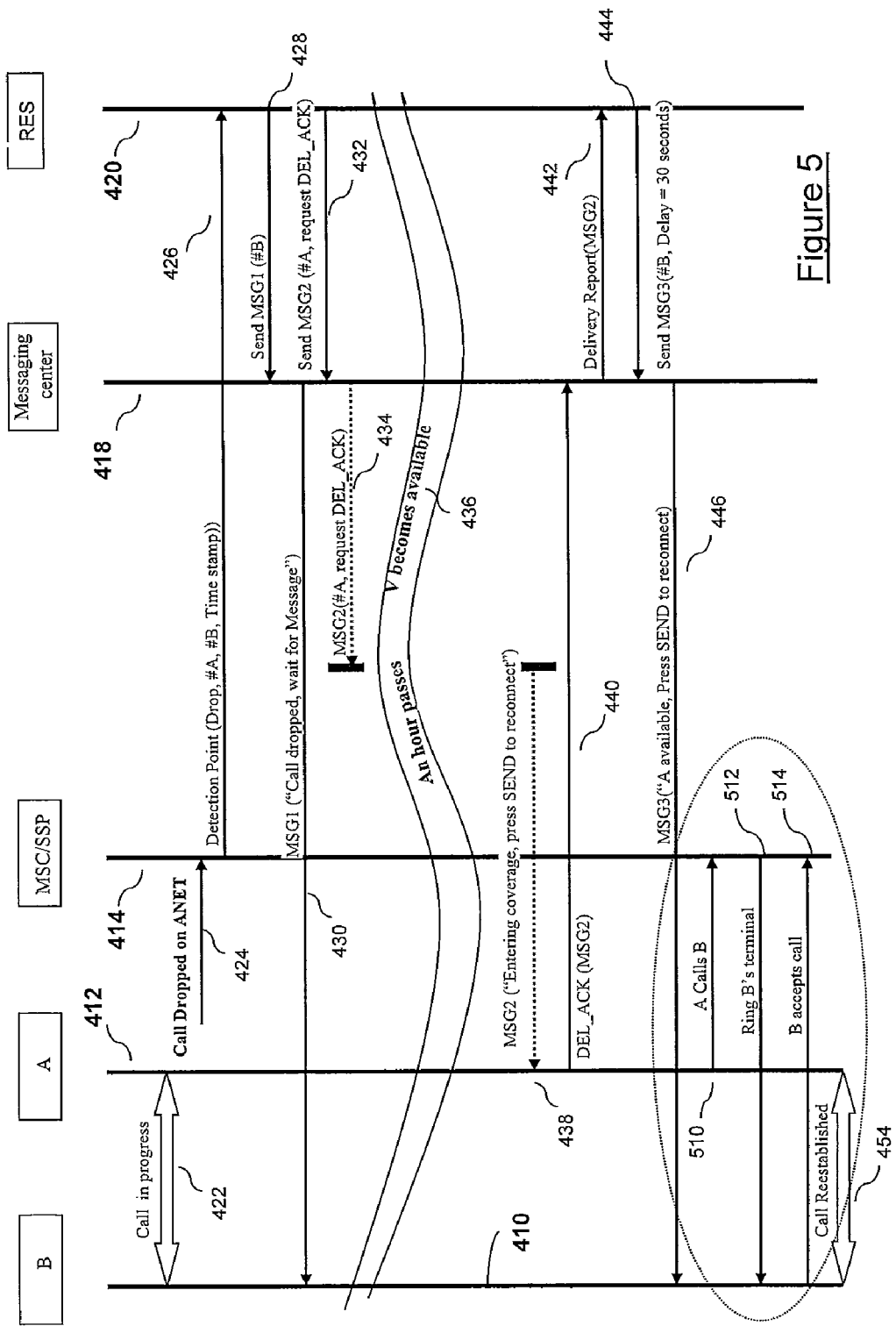

FIG. 5 provides a schematic description of the data flow between terminals and network entities according to the SMS-based embodiment with automatic triggering, with a second ending scenario.

Figure 6:
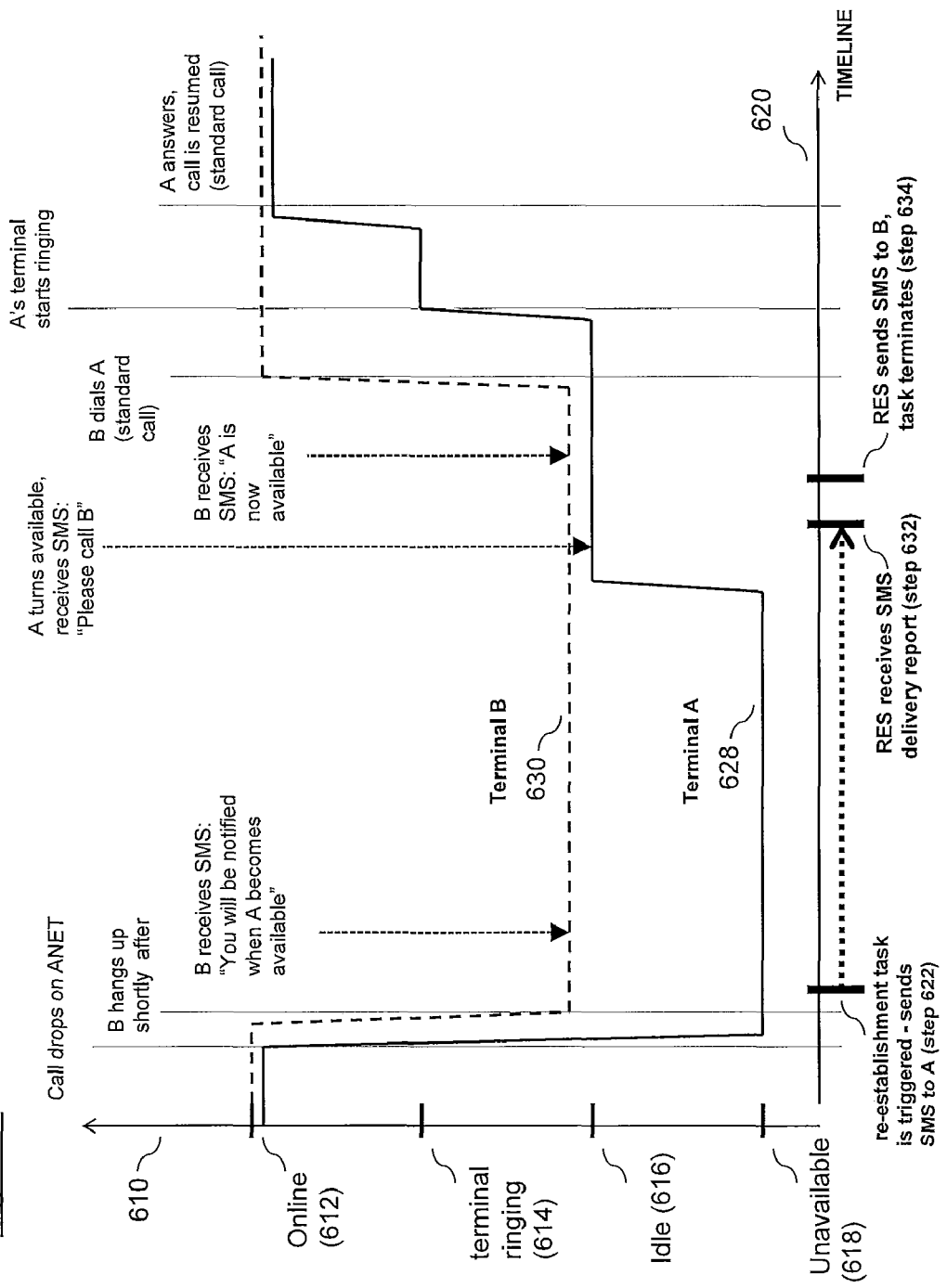

FIG. 6 provides an elaborate description of the timeline occurrences according to the SMS-based embodiment with SMS triggering.

Figure 7:
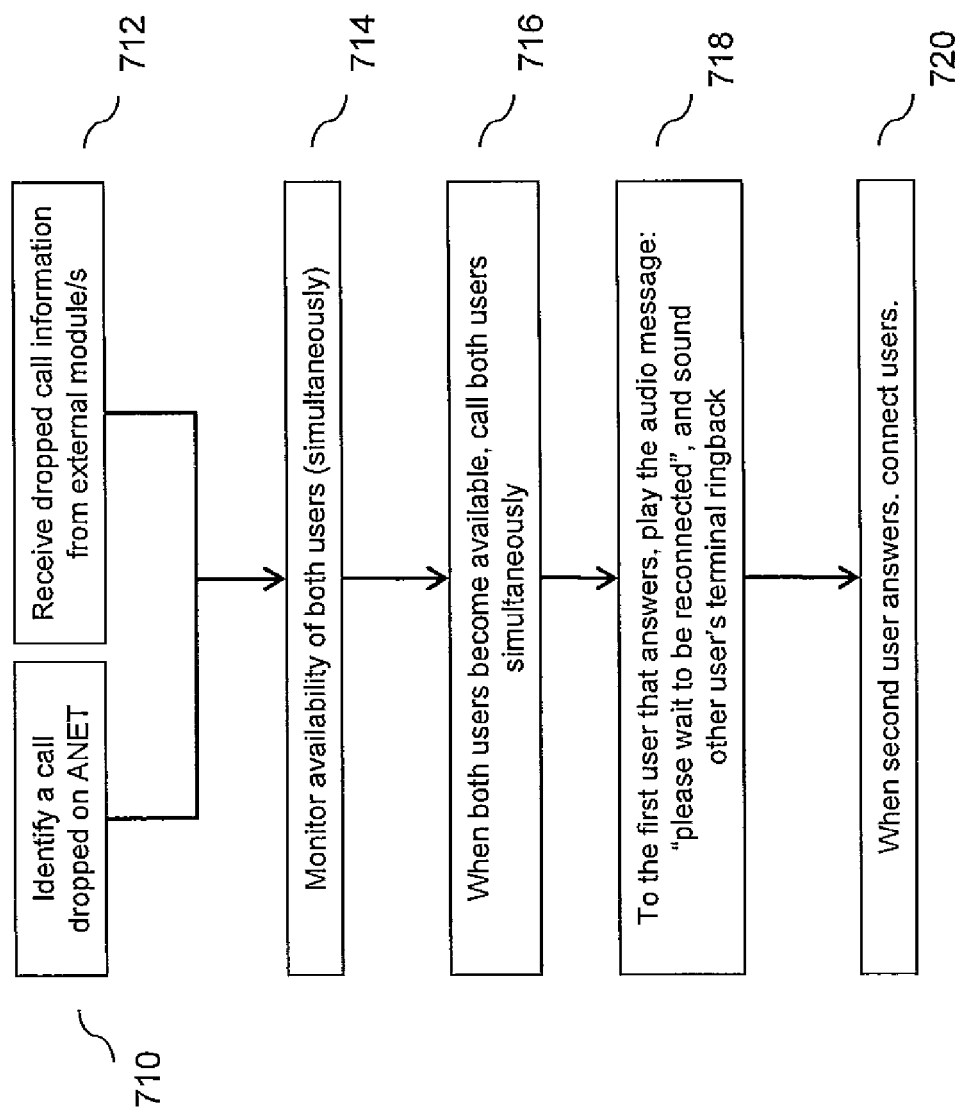

FIG. 7 provides a schematic description of the stages performed by the RES for each occurrence of a dropped call according to the HLR-based Re-establishment (simultaneous ring) embodiment with automatic triggering.

Figure 8:
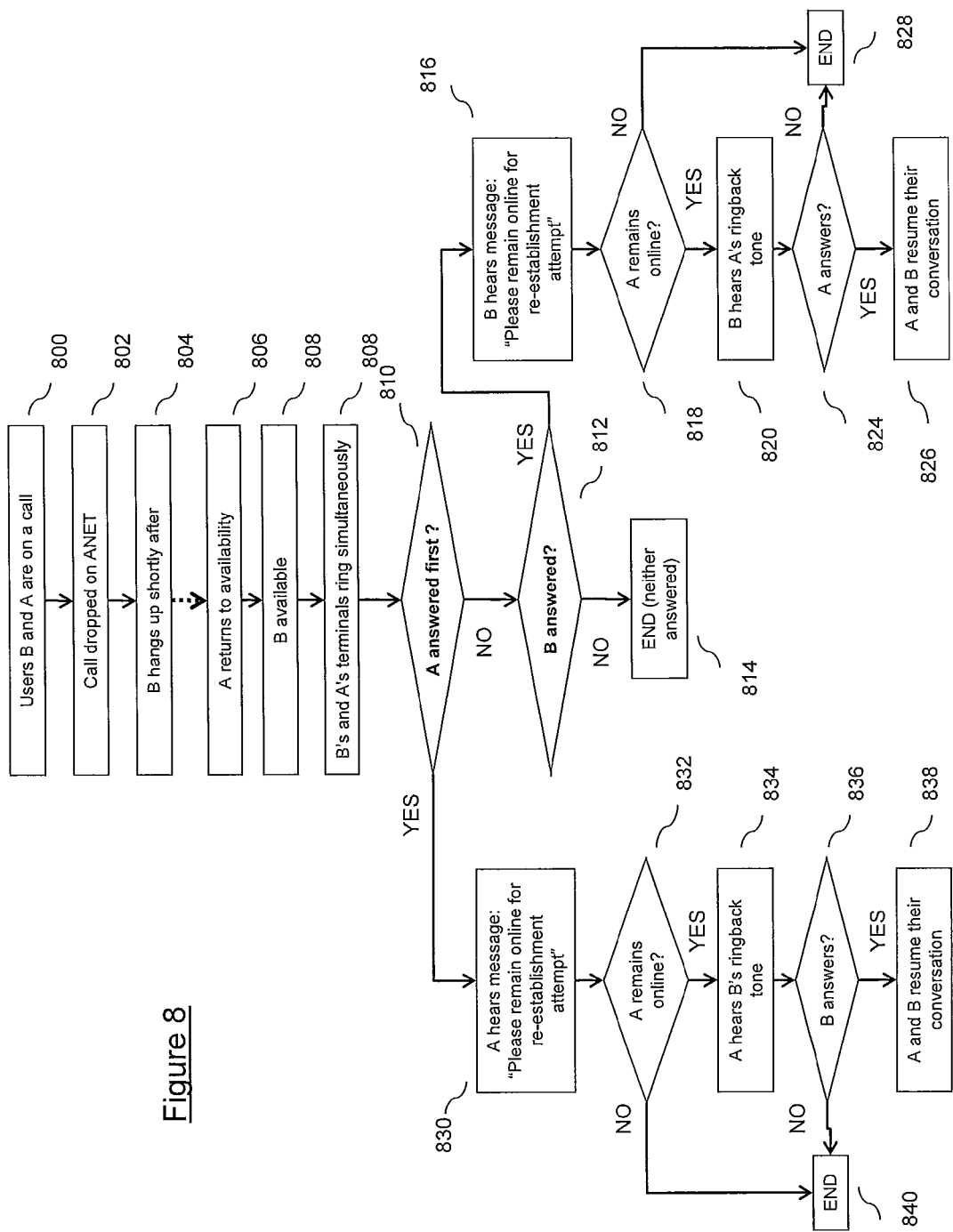

FIG. 8 provides an elaborate description of the users' perspective for each occurrence of a dropped call according to the HLR-based Re-establishment embodiment with automatic triggering (simultaneous ring).

Figure 9:
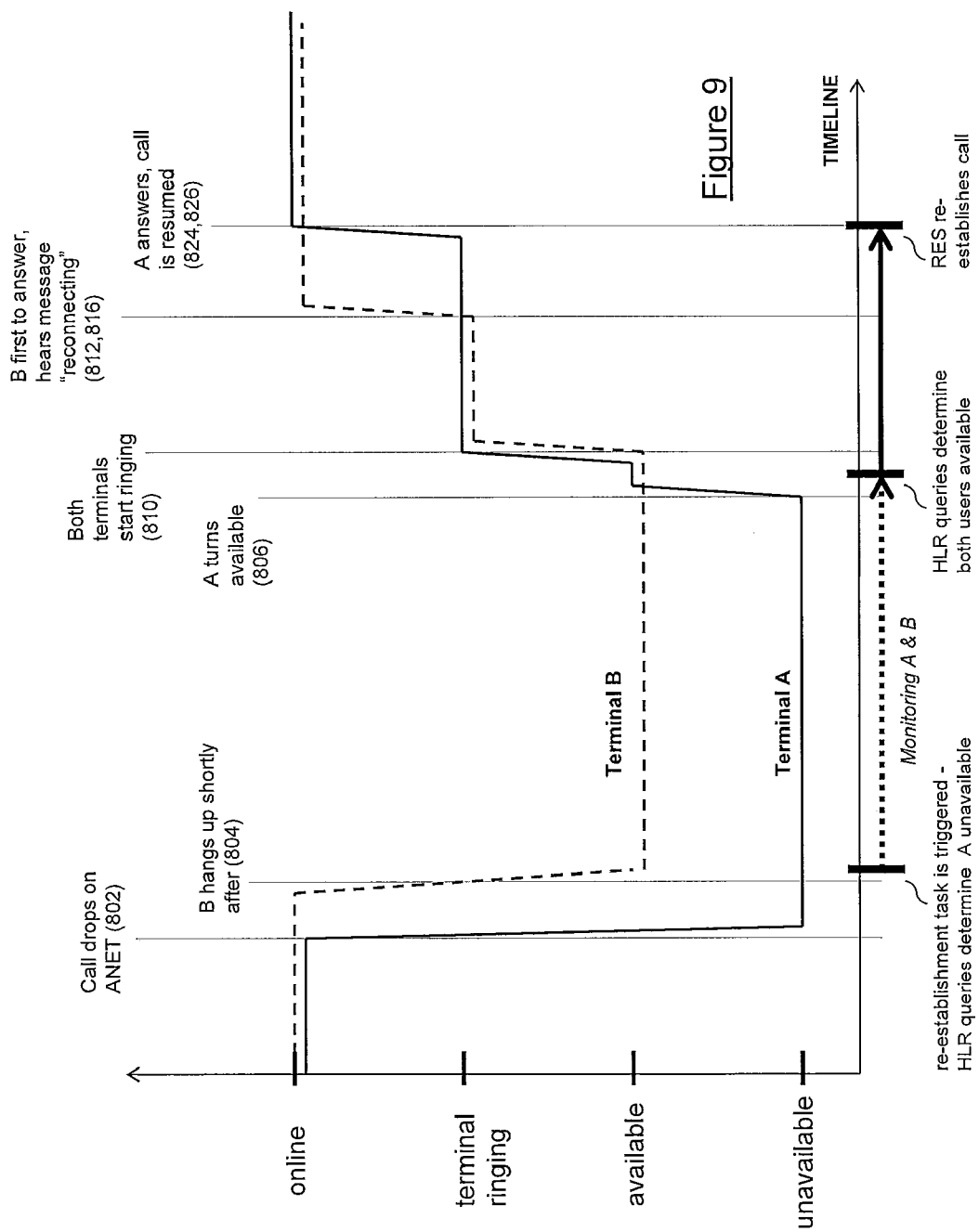

FIG. 9 provides a timeline perspective of one (desired) scenario according to the HLR-based Re-establishment embodiment with automatic triggering (simultaneous ring).

Figure 10:
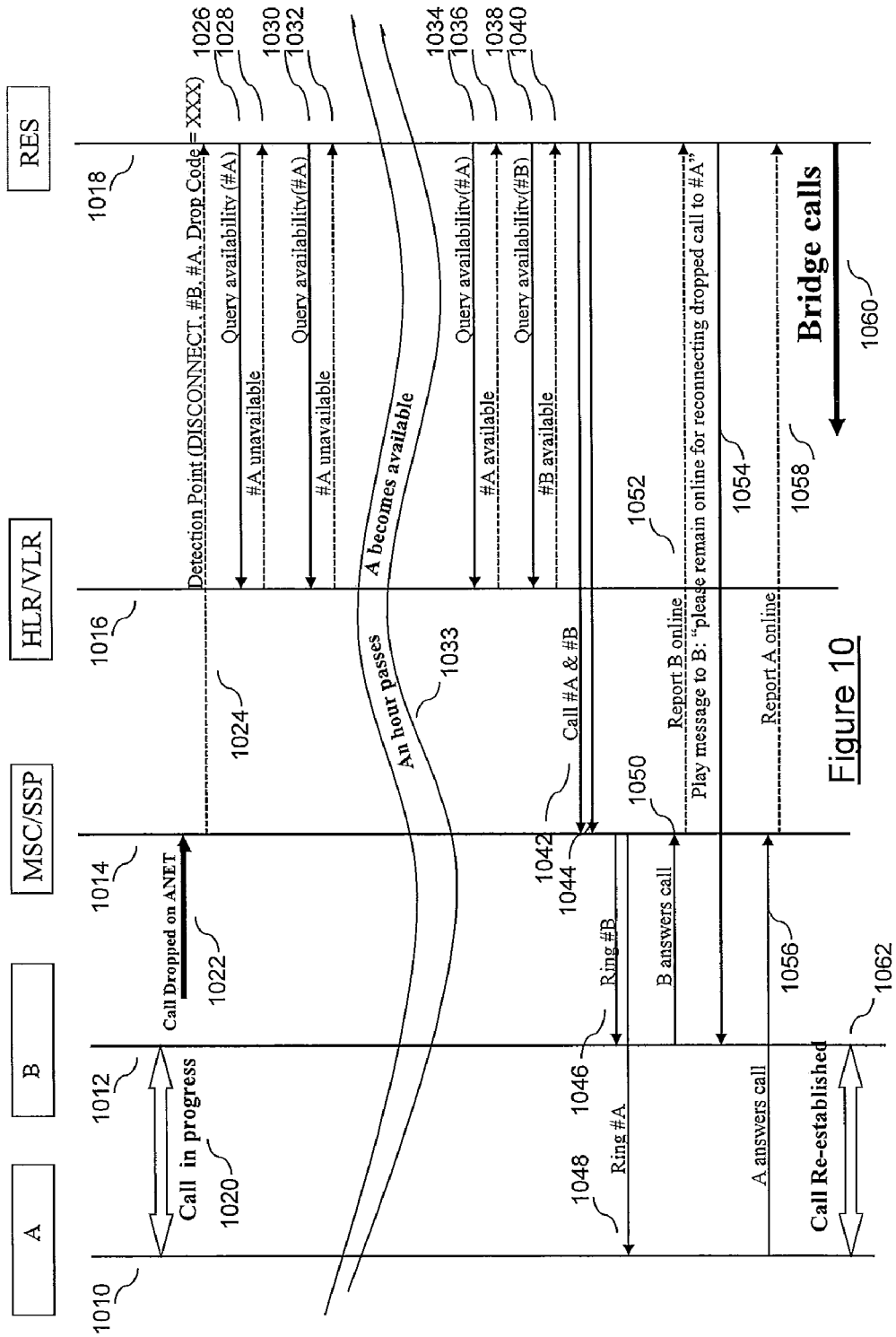

FIG. 10 provides a schematic description of the signaling traffic involved in the process of connecting users A and B following a dropped call according to the HLR-based embodiment with automatic triggering (simultaneous ring).

Figure 11:
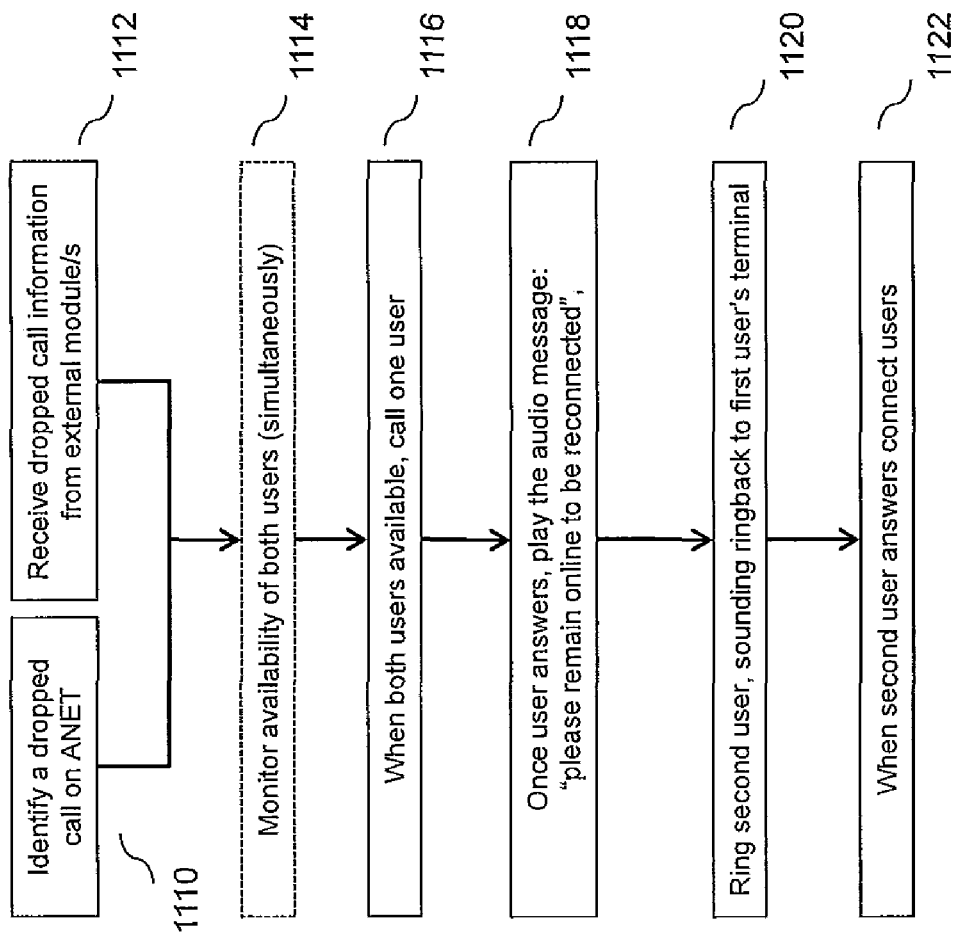

FIG. 11 provides a schematic description of the stages performed by the RES for each occurrence of a dropped call according to the HLR-based Re-establishment (one-ring-at-a-time).

Figure 12:
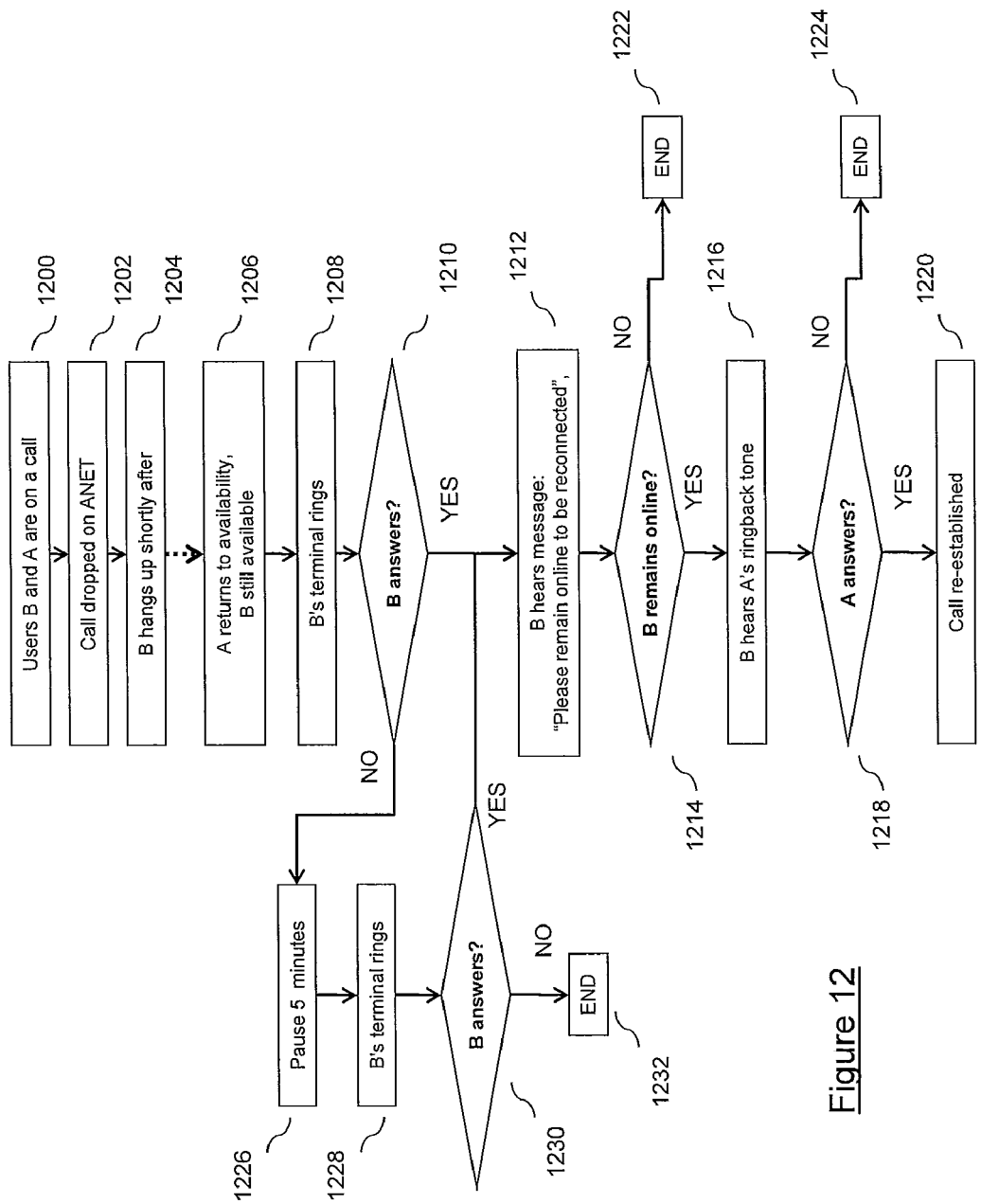

FIG. 12 provides an elaborate description of the users' perspective for each occurrence of a dropped call according to the HLR-based Re-establishment embodiment with automatic triggering (one-ring-at-a-time).

Figure 13:
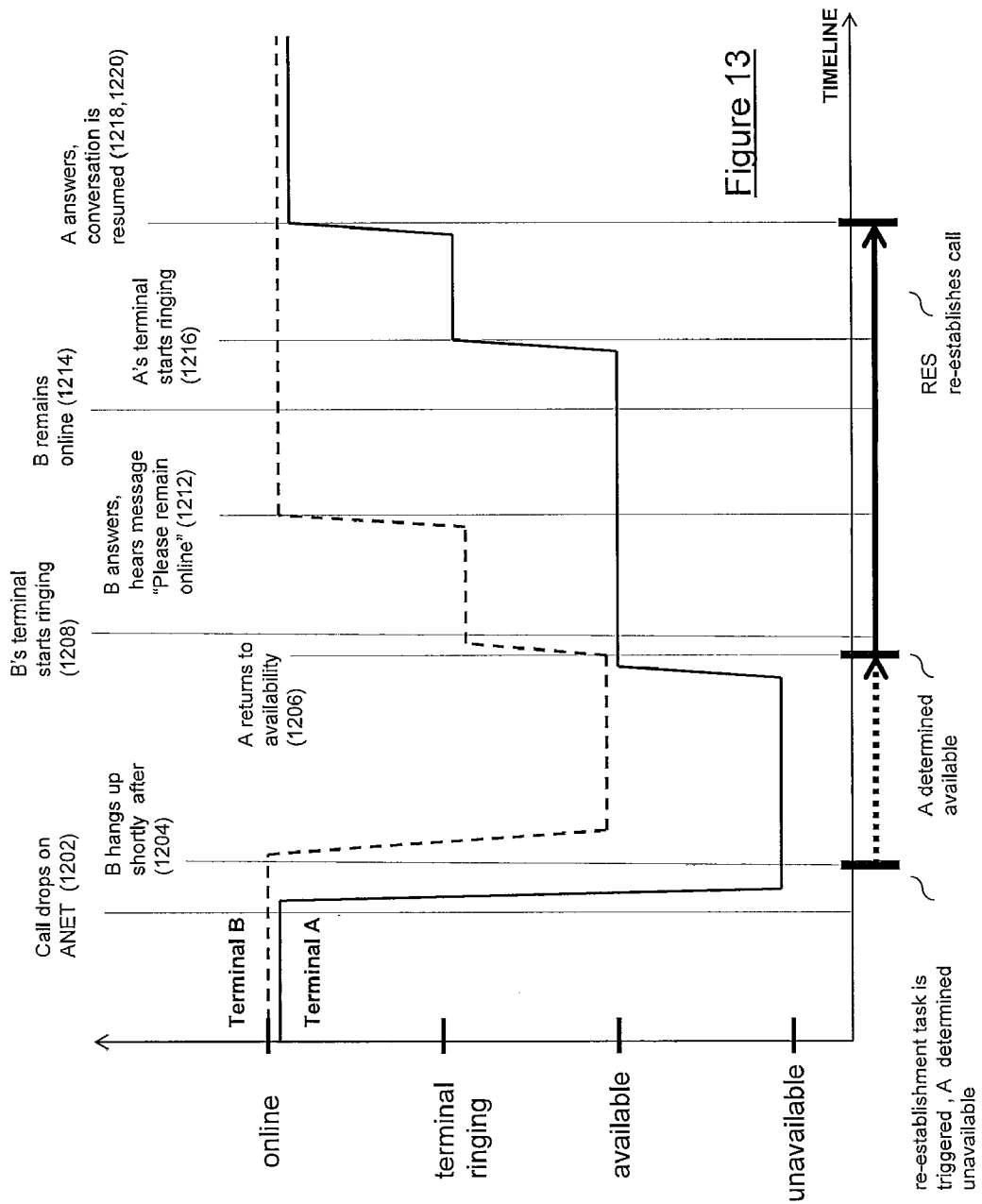

FIG. 13 provides a timeline perspective of one (desired) scenario according to the HLR-based Re-establishment embodiment with automatic triggering (one-ring-at-a-time).

Figure 14:
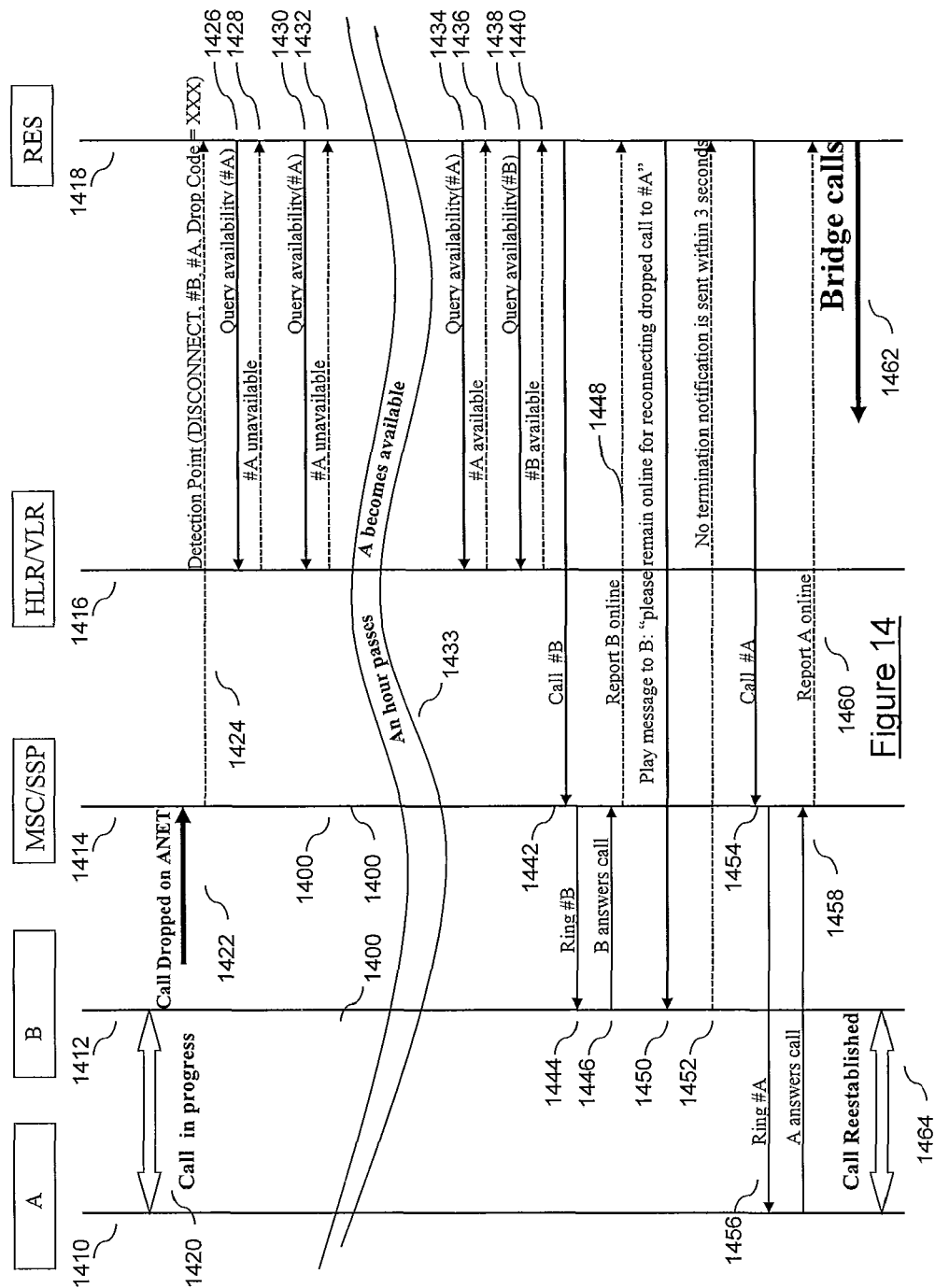

FIG. 14 provides a schematic description of the signaling traffic involved in the process of connecting users A and B following a dropped call according to the HLR-based embodiment with automatic triggering (one-ring-at-a-time).

Figure 15:
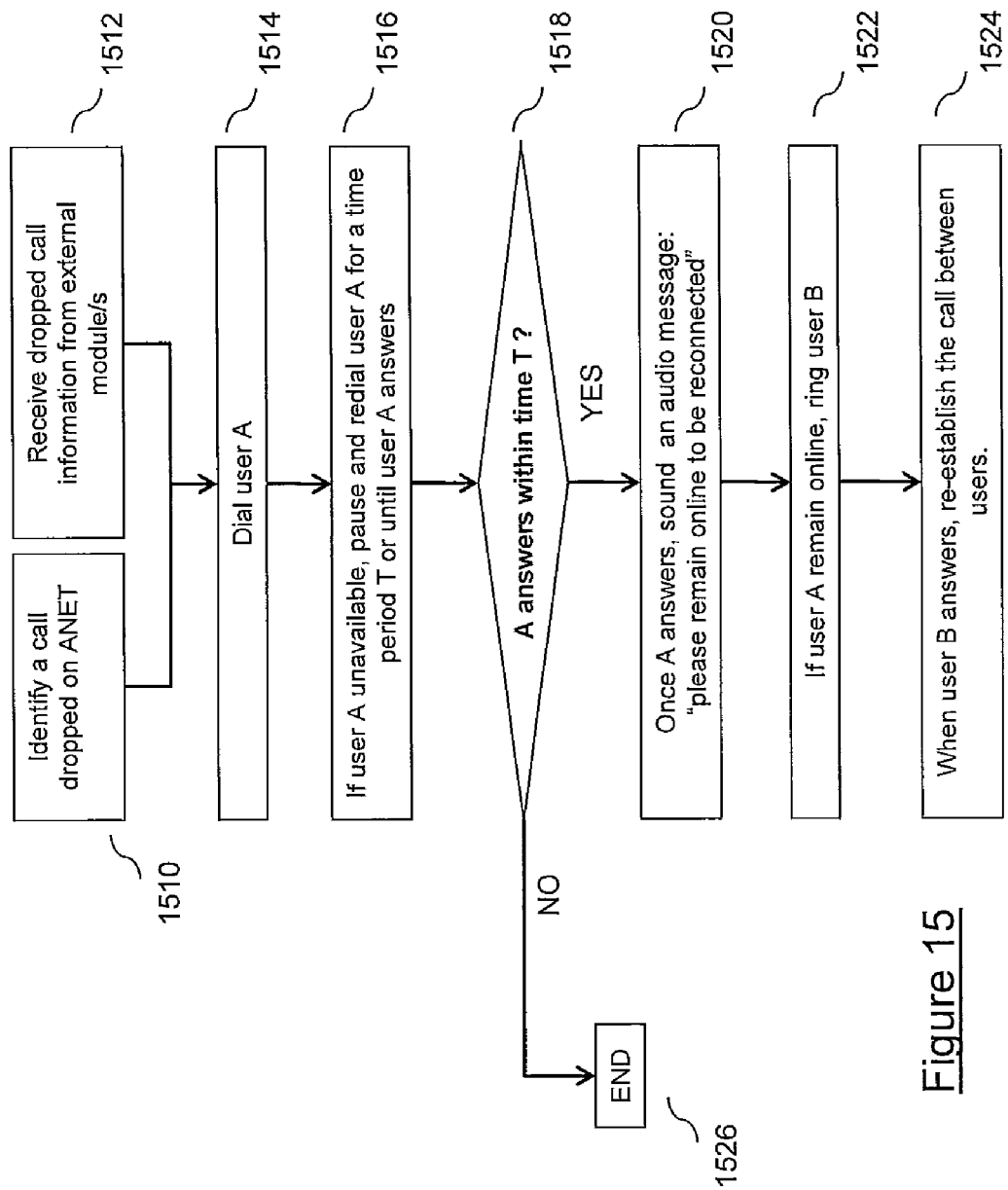

FIG. 15 provides a schematic description of the stages performed by the RES for each occurrence of a dropped call according to the Ring-based embodiment with automatic triggering.

Figure 16:
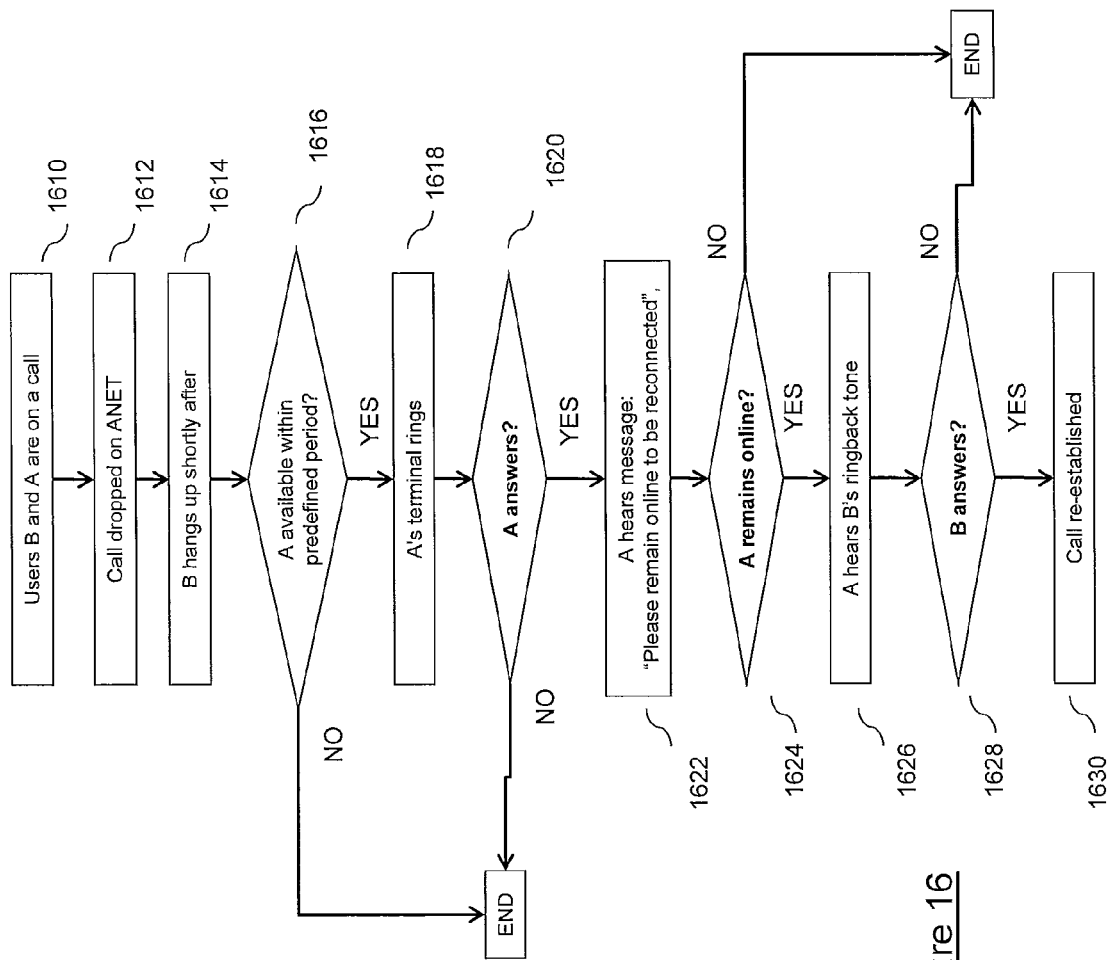

FIG. 16 provides an elaborate description of the users' perspective when reconnecting users B and A after their call has dropped, according to the Redial-based Re-establishment with Automatic Triggering.

Figure 17:
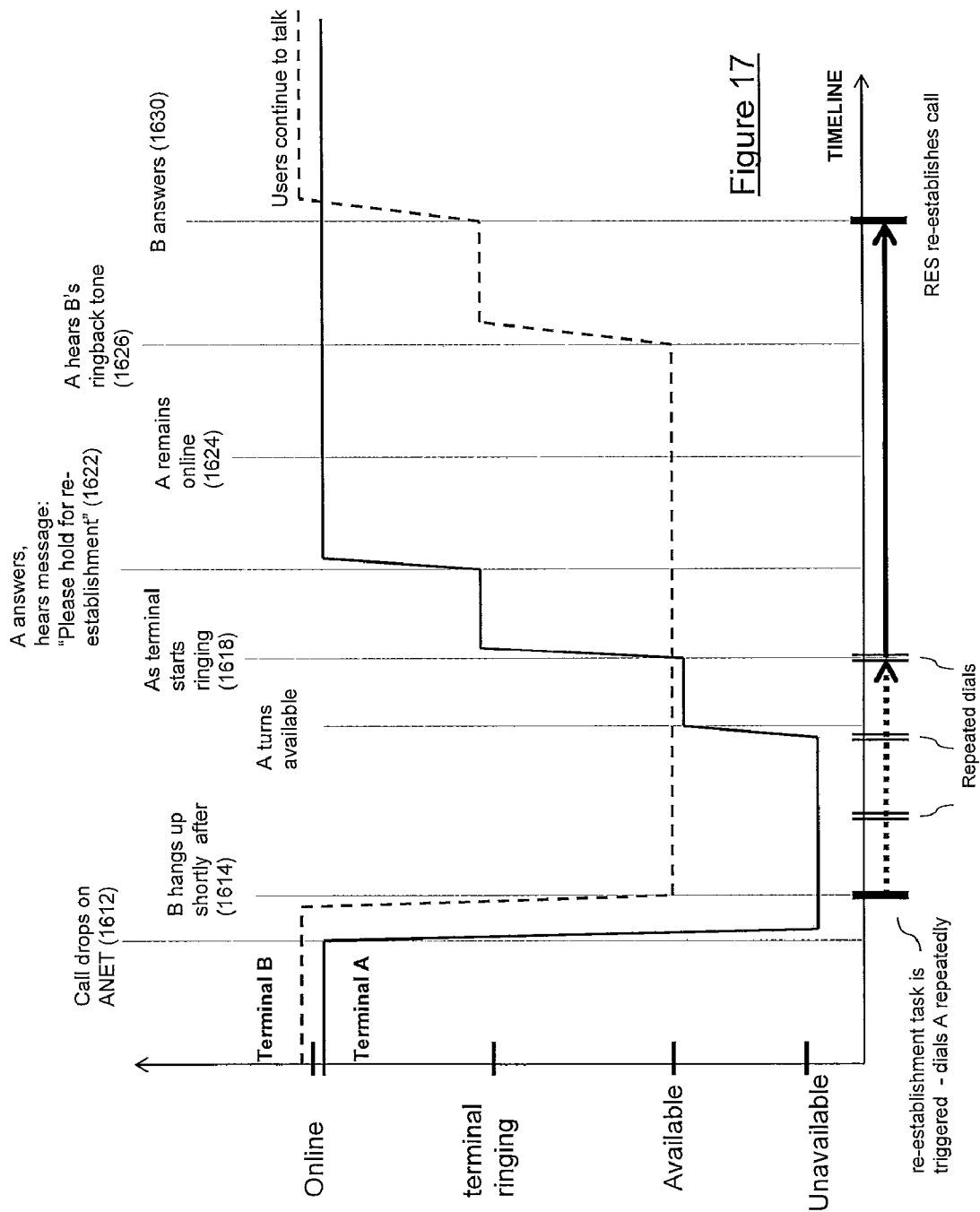

FIG. 17 provides a timeline perspective of one (desired) scenario according to the Redial-based Re-establishment with Automatic Triggering.

Figure 18:
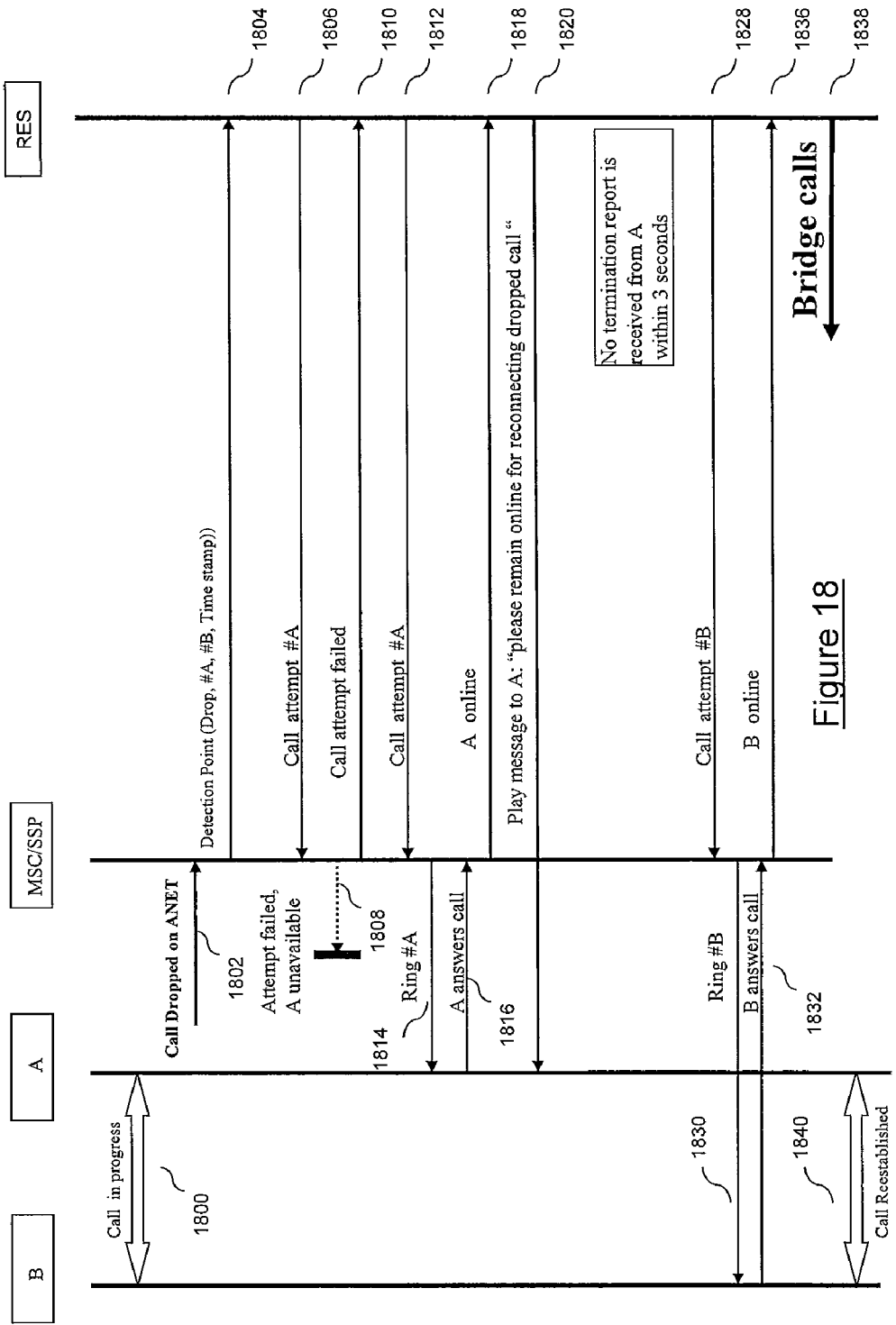

FIG. 18 provides a schematic description of the signaling traffic involved in the process of connecting users A and B following a dropped call according to the Redial-based Re-establishment with Automatic Triggering embodiment of the present invention.

Figure 19:
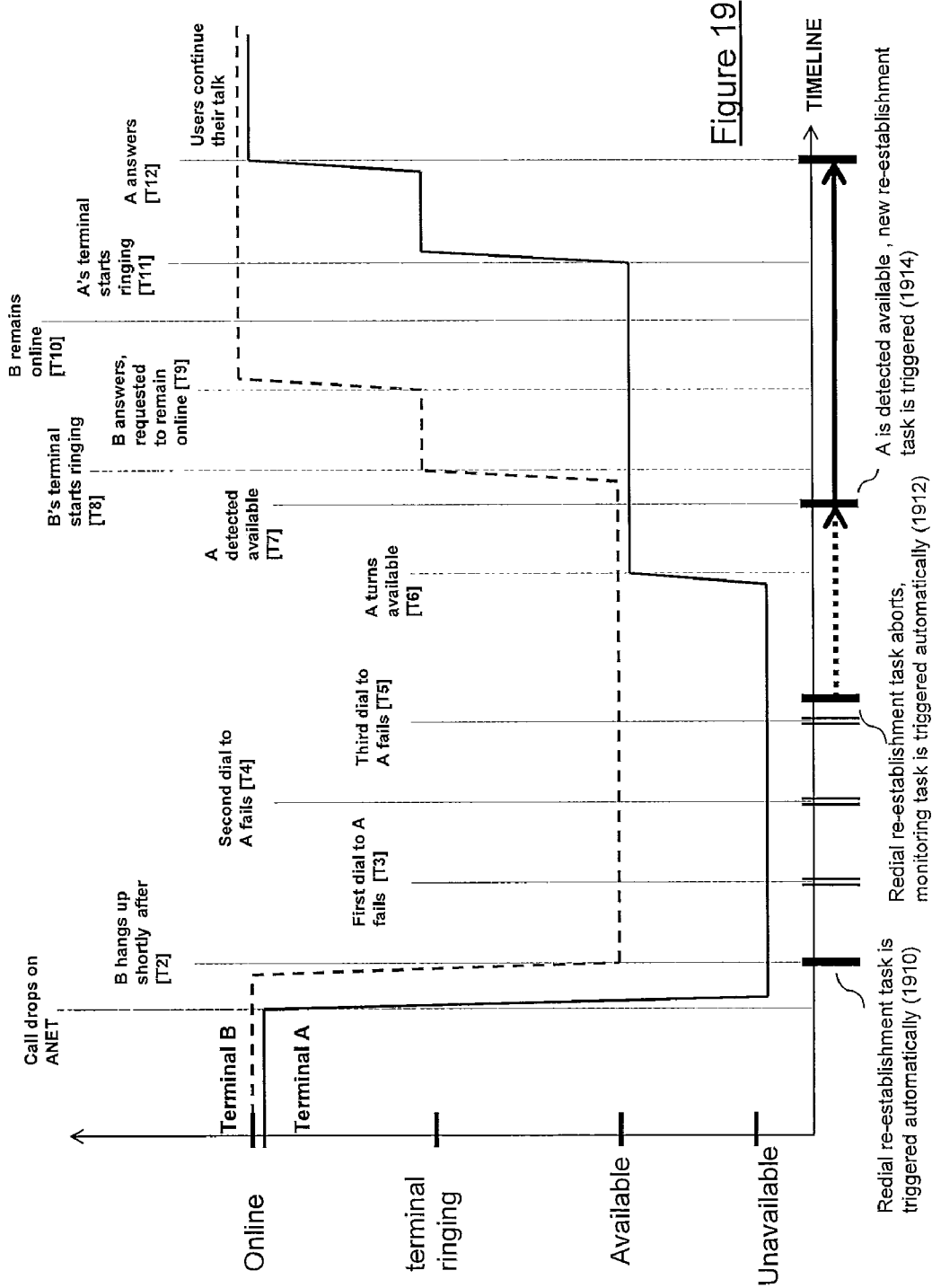

FIG. 19 provides a timeline perspective of a combined embodiment, in which first a redial-based re-establishment task (automatically triggered) is tried, and when unsuccessful, an HLR-based re-establishment is automatically triggered.

FIG. 20 provides a timeline perspective of a combined embodiment of the HLR-based re-establishment embodiment according to the present invention and a method taught in a co-pending US application.

DETAILED DESCRIPTION OF CERTAIN EMBODIMENTS OF THE INVENTION

1) Introduction and Overview a) General

The present invention addresses these needs, in part, by providing a system for re-establishing dropped calls and/or notifying users that a dropped call can be re-established. The system, when installed in a network, supports re-establishment of dropped calls in which at least one user is a user of the network. Preferably, both users involved in the dropped call are notified that a previously-dropped call can be re-established, and are provided a convenient option to re-establish the call. Preferably, both users are informed of the service flow status to the maximum extent, so as to minimize premature dialing attempts.

In accordance with one aspect of the invention, a system and method for facilitating re-establishment of dropped calls is provided. The system subject of the present invention is generally denoted as RES—Re-establishment System. It should be understood that that term is only a convenient abbreviation.

The approach that is applied by the RES will be hereinafter denoted "call re-establishment". According to this approach, all resources associated with the disconnected call are released and a totally new call is established completely independent of the resources associated with or allocated to the dropped call. Notably, this approach is by far different than the approach of preserving call resources from the previously-dropped call and using them for the new connection, which will hereinafter be denoted "dropped call reconnection". The dropped call reconnection approach effectively suspends the teardown of a session in at least one of the networks, rather than performing total call teardown. According to the call reconnection approach, typically the party that was not disconnected (hereinafter referred to as user B, subscriber of network BNET) remains online waiting for the disconnected party (hereinafter referred to as user A, subscriber of network ANET) to rejoin the connection.

The RES is implemented on a computer having a memory and a database for executing modules therein, the computer being in communication with the communication network. The RES provides users with notifications that a previously-dropped call can be re-established, and also offers users a convenient method for re-establishing the call soon after it is possible to do so. Users can opt to accept the offer if they desire to re-establish the disconnected call or to decline it if such re-establishment is not desired.

The call re-establishment approach according to the present invention is in various aspects superior to the call reconnection approach.

First, call reconnection typically involves keeping user B online waiting for user A to rejoin. At many dropped call occurrences, at the time of the drop it is not known how much time it will take until conditions allow a connect with user A. Therefore, if user B is kept online, in many cases he/she will find out that a renewed connection with user A cannot be achieved within a reasonable time and that he/she had been held online in vain, which is obviously counterproductive. Furthermore, once user B has hung-up the call the reconnection task is terminated. This means that any dropped call that cannot be reconnected within the time user B remains online (typically not over 10-20 seconds), will never be reconnected.

In contrast, the call re-establishment system (RES) according to the present invention does not require user B to remain online. Rather, user B hangs up and is notified only when user A is online or when there is a high chance that user A will answer the call. This spares user B waiting online in vain in cases when it takes user A a long time to return to availability, and ensures that he/she will be notified of user A's return to availability even if it takes minutes or possibly hours.

Second, implementing a reconnection system in an existing network typically involves provisions for intervention and, indeed, suspension of the existing call teardown procedure in the network executed for every call that is terminated in the network (111). As the call teardown procedure involves releasing resources in various network modules, suspending it typically requires extensive software/hardware installations and/or modifications in various network modules that are involved. For example, reconnecting calls that dropped due to a bad connection between terminal A and its serving base station require installing in that specific base station software/hardware that support the reconnection procedure. These network-wide installations and modifications are viewed as hurdles for implementing the service at existing networks.

In contrast, since the RES is only activated after the call has dropped, it does not require any intervention nor suspension in the existing call teardown procedure. Therefore, implementing the RES in existing networks requires little or no installation or modification in existing network modules. This architecture enables the network-wide implementation of the RES to be relatively rapid and non-costly.

Third, since call reconnection services must be activated within a short period of time after the call (i.e. before user B hangs up the call) these services are time-critical and are therefore typically implemented by realtime modules. Implementing a reconnection service as a realtime module requires close integration with the network and very high performance, e.g., high processing capabilities and/or bandwidth. These requirements are especially significant at times of high demand for the service, e.g., at times of heavy network traffic or at occurrences when due to network malfunction or external interference many calls are dropped within a short time.

In contrast, since the RES does not require activation before user B hangs up the call, it can be activated after a longer time and therefore does not have to be implemented as a realtime module. Therefore, its integration with the network is looser than that which is required for call reconnection services. Likewise, performance requirements are substantially lower than those of reconnection services.

For each dropped call, the RES service flow can be roughly divided into three stages: detecting the dropped call, triggering a re-establishment task, and carrying out the re-establishment task. As has been noted above, the first stage of this process is a standard procedure in cellular networks and therefore is merely a predicate step to enable the invention described herein, but which forms no part of the present invention. The main focal points of the present invention are illustrated in connection with several, different embodiments each of which realizes the re-establishment task and triggering techniques. The triggering techniques are independent of the re-establishment task embodiments though some combinations thereof may be more practical than others.

b) Detection

For re-establishment of a dropped call, the very event of unintentional call termination (sometimes referred to herein as unintentional call disconnection) has first to be detected. Detecting that a call between user A and user B has dropped can be performed as a task as in the RES which is connected to a network associated with at least one of the parties to the call. The RES has a detection task module executing a detection task on a processor thereof and operative to receive the number identification of both users, receive a release message associated with the call attempt, parse the release message in a machine executing on the RES to obtain the cause indicator, as explained hereinafter, and test the cause-indicator parsed from the release message to determine a match to a prescribed criterion.

Such detection is performed as a task as part of the functions of the RES which is connected to a network associated with at least one of the parties to the call. The RES routinely receives release messages from the MSC it is associated with, including information originating from the MSC of the network in which the call has been terminated or directed to. Release messages typically progress on the signaling path between MSC's, and provide indications from one MSC to another that, e.g., an active call has been terminated or that a call set-up attempt has been unsuccessful.

Release messages typically include one or more cause-indicators, or clearing codes. These indicators traditionally serve as a useful debugging tool for tracking and analyzing network malfunctions and singularities. One of the focal points of the present invention is exploiting these indicators for detecting dropped calls. An example of the cause indicator codes is the ISDN Event Cause Codes, also known as Bellcore Standard ISDN Cause Codes or SS7 Cause Codes. These codes are associated with the Q.931 Standard.

As an example, Cause No. 16 signifies normal call clearing. This cause indicates that the call is being cleared because one of the users involved in the call has requested that the call be cleared, i.e. has pressed END. Obviously, when this cause is received during an active call a triggering of the re-establishment task is unnecessary.

In a further example, Cause No. 38 signifies that a network is out of order. This cause indicates that a user's network is not functioning correctly and that this condition is likely to last a relatively long period of time. In this case, triggering the re-establishment task is not likely to be successful. In a further example, Cause No. 41 signifies temporary failure. This cause indicates that the network is not functioning correctly and that the condition is not likely to last a long period of time. In this case, activating the re-establishment task may be desired.

In a further example, Cause No. 54 signifies that called party has barred incoming calls. In this case, it is generally useless to activate the re-establishment task since no incoming connection can be made to called party even if found available.

As such, a cause code generated by any call can be tested by code executing to implement this embodiment against values representing different causes for the call termination to determine whether the call termination has been intentional or unintentional. The detection task in the RES in fact parses the release message in a machine executing the RES to obtain the cause-indicator. The detection task further tests the cause-indicator parsed from the release message to determine if it corresponds to a prescribed criterion, i.e. a release code indicative of unintentional call termination.

In certain implementations, it may be desired to allow selective triggering of the re-establishment tasks, e.g., for different users. In these cases, an additional task can be implemented to access a database which contains data pertaining to users' preferences, e.g., whether they wish the re-establishment task to be triggered automatically, with a prompt, or not at all.

As has been demonstrated, at certain cases the cause indicators provide more detailed information as to the reason the call has dropped. This information may be indicative, e.g., for assessing whether the interruptions causing the drop are typically of short-term or long-term. This distinction may be input to the re-establishment task in order to optimize its performance and resource-allocation at the specific case-at-hand.

A considerable subset of dropped calls is the outcome of communication failures between the terminal and the base station. Automatic detection of a dropped call in a Base Station and transmitting it to an MSC is well known to those familiar in the art of cellular communication. For example, U.S. Pat. No. 6,343,216 by Kim et al. details the detection of the service impediment by the by the Base Station and transmitting the information to the Mobile Switching Center. Those, as well as other possible detection methods, could be also used in conjunction with the triggering embodiments of the present invention. Therefore the dropped calls detection, by itself as previously described, is not an inventive element.

c) Triggering Embodiments

The re-establishment task as described above can be triggered according to the present invention in various options. According to one embodiment, denoted "Automatic Triggering", after detecting a dropped call the RES allows the call to be torn down at both users' serving networks and then triggers the re-establishment task automatically, i.e. without requesting consent of either user. This is the simplest option. However, it does not enable users to prevent the triggering of the re-establishment task in cases when re-establishment is undesired.

Another option is to allow selective triggering of the re-establishment task based on user A and/or user B's approval set prior to the call dropping. This approval can be accessed, e.g., by an additional task that accesses a database which contains a subscriber table storing data representative of at least one user's approval. This database may be integral to the RES, or be an external database accessible by the RES.

A further option that may be desirable is to condition the triggering of the re-establishment task on a case-by-case user decision. According to this option, at least one user is provided a prompt for triggering the re-establishment task. The following embodiments are examples of this approach.

According to one case-by-case approval embodiment, denoted "IVR Triggering", after detecting a call disconnection the RES allows the call to be torn down at both users' serving networks and then presents the re-establishment offer to user B by dialing him/her and providing an IVR interface. The IVR application introduces the RES system and requests an approval on part of user B for triggering the re-establishment task, such as pressing a key. If user B chooses to trigger the re-establishment task, preferably the IVR application will issue a confirmation that the re-establishment task had indeed been triggered.

According to another case-by-case approval embodiment, denoted "CallerID-offered Triggering", after detecting a call disconnection the RES allows the call to be torn down at both users' serving networks and then presenting the re-establishment offer to user B by dialing him/her with a pre-determined and preferably meaningful alphanumeric string displayed as the CallerID on his/her terminal (the string displayed when receiving an incoming call, typically displaying the number of the caller). This string indicates to user B that his/her answering the call would trigger a re-establishment task to user A. User B can then choose whether to answer or decline the call. If user B chooses to answer, preferably a voice message sounded to user B will confirm that the re-establishment task had indeed been triggered.

According to yet another case-by-case approval embodiment, denoted "SMS-offered Triggering", after detecting a call disconnection the RES allows the call to be torn down at both users' serving networks and then presents the re-establishment offer to user B by sending him/her an SMS containing the re-establishment offer. Preferably, the SMS provides a shortcut method (2-3 keys) for user B to indicate his/her consent while still in the SMS reader application, such as issuing a return SMS to the RES or dialing a specified number.

d) Re-Establishment Task Embodiments

A task for notifying user A and/or user B of the possibility to re-establish the call executes within the RES using a re-establishment task module. Typically, the re-establishment task operates as to periodically assess the availability of user A using data provided over the network for a predefined time limit until user A becomes available. Therefore, a core element in the process of re-establishment according to the present invention is assessing availability of the users involved, following the call drop.

Similarly, a task for re-establishment of a call between user A and user B of executes within the RES using a re-establishment task module. Typically, the re-establishment task operates to facilitate the process of re-establishment of the call by providing re-establishment cues which typically serve as shortcuts for user to re-establish their call.

In one embodiment of the present invention, denoted "Dialing-based Re-establishment", the re-establishment task begins with a sequence of repeated call attempts initiated ("automatically dialed") by the RES to user A. These attempts are preferably limited to a short time period in order not to load the network. Once user A answers the call, the RES provides an IVR application (Interactive Voice Response) informing that reconnection with user B is now possible by pressing a key or by simply remaining online. If user A declines the offer either by pressing a key or by hanging up, preferably a message is sent to user B informing that user A has become available. If user A accepts the offer by remaining online, the RES dials user B and once user B answers, connects users A&B. If user B fails to answer the call the re-establishment task aborts.

In the Dialing-based re-establishment embodiment the following sequence might occur: When a call drops on user A, user B (who might not be aware of the RES) might attempt to dial manually to user A. In that case a time race will develop between user B and the RES for reaching user A. If the RES wins this race, the RES will leave user A online, preferably sounding him/her a message to hold, and then dial user B until found available or until user A hangs up. If user B wins the race, the (now obsolete) re-establishment task is aborted by the RES once it detects a report of normal termination of the A/B call.

In another embodiment of the present invention denoted "HLR-based Re-establishment", the re-establishment task begins with repeatedly querying user A' availability in a database such as an HLR (Home Location Register). Once user A is determined available, the RES dials user B and offers him/her by IVR to remain online for call re-establishment while other user's terminal starts ringing. If user B remains online, once user A answers, the RES reconnects the users. In another version of the "HLR-based Re-establishment", the re-establishment task begins with repeatedly querying users' availability in a database such as an HLR (Home Location Register). Once both users are determined available, the RES rings both terminals simultaneously, and the first user to answer is offered by IVR to remain online for call re-establishment while other user's terminal keeps ringing. If the first user remains online, once the second user answers, the RES reconnects the users. In another version of the HLR-based re-establishment, the re-establishment task begins with repeatedly querying users' availability and once both users are determined available, the RES rings only one user's terminal. When user answers he/she is offered by IVR to remain online for call re-establishment. Only after first user remains online, does the RES dial to other user. Once the other user answers, both users are reconnected. In another version of the HLR-based re-establishment, after both users are determined available the RES sends one user an SMS, preferably providing a shortcut dial method to other user.

In yet another embodiment of the present invention, denoted "SMS-based Re-establishment", the re-establishment task begins with the RES sending user A an SMS message, prompting him/her to dial to user B. Preferably, the SMS message provides user A a shortcut dial method to B, such as B's number embedded in the SMS text. Once user A becomes available, he/she receives the SMS and may then dial to B a standard call from his/her terminal, possibly using the shortcut dial method.

Advantageously, and in messaging systems in which such option is enabled, the SMS sent by the RES to user A is configured to request a delivery report once user A's terminal has received the SMS. The delivery report serves as an indication to the RES that user A has become available. When the RES receives the delivery report, it sends an SMS to user B advising that user A has become available and preferably provides user B a shortcut dial method to user A. Advantageously, just after sending user A the SMS, the RES also sends an SMS to user B informing that a future message would be delivered to him/her once user A becomes available. Notably, sending an SMS and receiving an acknowledgement (delivery report) thereof are standard cellular network functionalities and therefore support inter-network operability of embodiments of the present invention that utilize such communications.

In another embodiment of the present invention, denoted "Dummy-SMS based Re-establishment", the re-establishment task begins with the RES sending user A a dummy-SMS message with a delivery report request. A "dummy-SMS", or for that matter any "dummy" message, a feature existent in many messaging systems, is an SMS that is sent to a recipient's SMS server but stopped short of being delivered to the recipient's terminal. A dummy-SMS can too be sent with a request for a delivery report to the sender, issued once the recipient returns to availability. Sending such dummy-SMS to user A provides a means for "quiet monitoring" of user A's availability, i.e., detecting user A's returning into coverage without his/her being aware of it. Once the RES receives the delivery note of the dummy SMS, it sends user B an SMS notifying that user A is now available and preferably provides a shortcut dial method. Then user B can dial a standard call from his/her terminal, possibly using the shortcut dial method.

The dummy-SMS based method may be, where applicable, in certain aspects superior to the HLR-based method, especially in the seconds following the drop. This is because after a call drops is typically takes some time (e.g., several seconds) for the HLR to be updated of user A's unavailability. Therefore, user A's availability data which is stored in the HLR might be outdated immediately following the drop. In the dummy-SMS method, however, a delivery report is sent from user A's SMSC.

In yet another embodiment of the present invention, user A's terminal is a "hybrid" construction, in which there is a first, cellular channel for communication and also a second communication channel comprising a different communication technology than the cellular channel. For instance, the second communication channel can provide communication using a Wi-Fi or WiMax technology. According to this embodiment, when a (cellular channel) call drops on user A's terminal, the RES attempts to reach user A using the second communication channel using appropriately coded modules. The modules that implement this attempt and the steps taken are preferably transparent to user B, who, according to one implementation, does not even require to have a terminal of "hybrid" construction. In a variation of the foregoing, user B's terminal is also a hybrid construction, and the RES is configured with appropriately coded modules to determine the channels utilized for reaching users A and B based on criteria such as availability, quality of signal, cost, user preference settings, etc. Moreover, the RES can communicate with each of users A and B using a different technology, while having the voice bridge performed, e.g., in the RES.

Notably, the aforementioned re-establishment embodiments can comprise components or aspects of a system constructed in accordance with the present invention. As can be appreciated by one skilled in the art, the aforementioned embodiments can be combined with one another in various ways to produce combined versions, which are still perceived as within the scope of the present invention. According to one combined embodiment, after a re-establishment task of a first type had failed to re-establish a call between users within its predefined time limit, a re-establishment task of a second type is triggered. It may be desired to allow selective triggering of the re-establishment task of the second type based on user A's and/or user B's approval. This approval can be obtained, e.g., by an additional task that accesses a database which contains a subscriber table storing data representative of at least one user's approval. In another embodiment, at least one user's approval is obtained by enabling him/her to make a case-by-case decision (i.e., for each dropped call event) as to whether or not trigger the re-establishment task.

A "notification lag" is defined as the period that passes between user A becoming available and the time user B is notified of this new status. For the HLR-based embodiment, this lag is determined by the sampling scheme utilized, e.g., by the RES monitoring module or by the monitoring scheme applied in the SMSC which notifies the RES of user's status. As sampling resources in a network are often scarce, an inherent tradeoff exists between minimizing the average number of HLR queries on the one hand, and minimizing the average "notification lag" on the other. This tradeoff can be settled in different sampling schemes in which possibly a varying querying frequency may be set to be based on the specific situation at hand.

Another approach for confronting scarcity in resources can be applied, based on a previously-defined hierarchy or classification between users. U.S. Patent Application 20070121852 to Taylor et al., titled "Method and System for User Prioritization within Telecommunication Services and in Particular within Call Completion Services", which is incorporated by reference in its entirety, teaches a system and method for hierarchical prioritization and execution of call completion services. In accordance with this approach, within the present invention users can be classified as "high priority" and "regular priority", whereas high priority users are allocated more network resources, such as availability querying resources, than regular priority users. This means, e.g., that high priority users will enjoy a shorter average notification lag than regular users.

It is to be understood that despite the distinction described above between "dropped call re-establishment" and "dropped call reconnection", notifications sent to the users according to the present invention are not required to adhere to this distinction. It may be more understandable to users if the "reconnection" language is used in the user interface, such as in service offers, acknowledgments and notifications.

e) Technical Implementation

A further core element in the dropped calls re-establishment processes according to the present invention is determining availability of the users involved following the call drop. Availability determination methods are extensively discussed in U.S. Pat. No. 6,804,509 to Okon et al., which is incorporated by reference in its entirety, in the context of call completion to previously unavailable destination. In that context, it is of high importance to determine the availability of a user without bothering or alerting him/her with periodic retrials. In U.S. Pat. No. 6,804,509, registration based-methods were assessed as inferior to determining availability with a call handshake procedure. The fact of the matter is that when it comes to inter-network communication (which indeed is the case with a considerable percentage of the calls), none of these availability monitoring methods works unless monitoring modules are installed in both networks and the RES is granted access to both systems. That requires a high level of integration and cooperation between the networks which is viewed as a hurdle in deploying the service. In contrast, the present invention enables monitoring the availability of users at possibly different networks avoiding the need for any integration or cooperation thereof.

FIG. 1a provides a schematic description of the high-level architecture of the cellular system connecting terminals A and B, in which a RES is installed. ANET (102) serving user A consists (among others) of the following modules and subsystems: an SMS center denoted SMSC (110), an HLR (106), several mobile switches (MSC), and a gateway switch (114). A RES module (112) is introduced according to the present invention (112). These entities are physically interconnected and communicate with each other via SS7 signaling (108). The MSC serving terminal A communicates with the serving mobile base station (118) serving terminal A. The mobile base station communicates with terminal A by RF communication. ANET is connected by a gateway switch (114) to an internetworking network (116) through which it is connected to BNET (122) which is serving terminal B. BNET consists of basically the same elements as ANET apart from the RES which is not present in this network. The MSC serving terminal B (124) communicates with the mobile base station (128) which communicates with terminal B (130).

The arrangement of FIG. 1a, therefore, provides a description of the most general case when a communication session is to be made between a network which is provided with a RES and a network which is not provided such system. As will be appreciated by persons of ordinary skill in the art, the blocks illustrated in FIG. 1b (and throughout the figures) can be implemented as modules that comprise code that, upon execution, configure a processor to perform the functions and interactions described herein.

FIG. 1b provides a schematic description the connectivity of the RES system with several important external modules, in the most general case. The RES (112) communication with the SMSC (110) is handled via SMPP or some other comparable IP protocol. Messages sent are requests for sending SMS, and messages received are delivery reports. The RES communication with the HLR (106) is handled via GSM-MAP or WIN/RESI41 protocol. The CSR issues availability queries to the HLR which are answered by availability reports. The RES communication with the MSC signaling side (104a) is handled in ISUP/INAP via SS7 network, whereas different queries and requests are sent from the RES to the MSC and indications and responses are sent back from the MSC to the RES. Additionally, the RES uses voice trunks to convey to the MSC voice side (104b) messages to be sounded to users.

Preferably, RES signaling is based upon the INAP protocol (the Intelligent Network Application Part (INAP) is a signaling protocol used in the Intelligent network architecture). Preferably, for CDMA/TMDA installations popular in North America, the RES will use the WIN version (Wireless Intelligent Network). The INAP/WIN protocols will be used to monitor calls as they progress through the network, identify calls which have been dropped, and trigger the RES's unique functionally if a dropped call has been detected. IS41 shall be used for accessing the HLR.

In another example, a protocol for GSM is called MAP (Mobile Application part). IS41 and MAP will be used for handling handoffs, SMS deliveries, and interactions with the HLR. ISUP (ISDN) user part will be used by Intelligent peripherals (IP) in order to set up or release calls, as well as play voice prompts.

As for the specific hardware used for implementing the RES, various configurations can be used depending heavily on the system requirements and the specific characteristics of the network in which it is implemented. By way of example, two such configurations are hereinafter described. (a) A series of stand-alone servers, e.g., HP Proliant 380G6 or equivalent Servers, which are NEBS compliant and provide High Performance in a 2U or 4U 19" rack-mount packaging. Each such server is fitted with either AudioCodes IPM260 8E1 cards for dealing with ISUP and Voice (i.e. prompts), or Ulticom SIGNALWARE boards and protocol stack, for INAP/WIN and TCAP. The actual number of cards depends on system load, realtime requirements, site characteristics, system design and performance. (b) A system based on a 19" Card cage that includes CPU blades. This form factor is often called COMPACT PCI, and is provide by vendors as e.g., HP, PTI and many others. The system also consists of audioCodes IPM260 16E1 BLADE, or the PTI 24E1. Additionally, Ulticom SIGNALWARE boards and protocol stack, for INAP/WIN and TCAP. Configuration (b) is far more useful for large single sites, and is also preferable for supporting high system performance.

For each dropped call, the RES service is executed by several tasks, such as detection of dropped calls, availability monitoring, availability notification, and call re-establishment. In systems which operate at highly dynamic environments it is generally advantageous to implement an architecture in which a task manager monitors and controls the execution this multitude of tasks. The task manager will, e.g., spawn tasks according to predefined events, such as spawning detection tasks in the events of receiving terminated-call data from an MSC. In another example, the task manager utilizes a timer module to control the termination or abortion of outdated tasks, such as outdated monitoring tasks. The task manager can also be utilized to control the RES performance at times of enhanced demand for call re-establishments, such as in peak hours of network usage. The task manager can handle such situations by different schemes of dynamic resource allocations. For example, the task manager can trim the resources allocated for different tasks, e.g., by setting a lower sampling frequency in availability monitoring tasks.

Each of the modules and other components that comprise the RES, whether hardware or code, can be integrated within the MSC of a telephone service provider. Integration of the RES can include co-location of the equipment or even installation of one or more of the modules on a server that operates the MSC or that is on the same local network as the MSC, for example, on the same LAN segment that has the MSC.

f) Concluding Comments Regarding Overview

It is to be noted that in the "SMS-based" and in the "Dummy-SMS based" re-establishment embodiments when user receives an SMS prompting him/her to dial the other user, even when this SMS provides a shortcut dial method, in order to reconnect he/she must initiate a standard call attempt to the other user, independent of the connection or re-establishment service. This means e.g., that the call will appear in the terminal's outgoing calls history, the call will be received at the destination with the caller's number and the call will be billed as an outgoing call from caller and as an incoming call for destination.

However, in the "Redialing-based", "HLR-based" and "Dummy-SMS based" re-establishment embodiments, the re-established call is not set-up as a standard call. Rather, both users are dialed by the RES, and once both have answered they are "bridged" to one another, e.g., as would be done in a standard conference call that a person sets up between him/her and two other users. When possible, the RES can preferably perform "call dropback", which is a well-known technique for pulling out of the connection and leaving the other two users connected to each other. The call dropback method is an "economical" method since it releases RES resources very soon after the call is commenced. In both of these re-establishment embodiments, neither user actually dials since both users receive incoming calls. This enables various billing schemes for the re-established call.

Embodiments that rely on dialing outgoing calls from the RES to users must detect with good reliability the outcome of the dialing, such as being answered by a person, a fax, an answering machine, getting a busy signal or a Ring/No Answer signal. For that end, at least two types of technological methods can be utilized: (a) Legacy predictive-dialer technology, which monitors and analyzes the voice channel traffic to differentiate between audio signals typical of, e.g., faxes, answering machines and an actual person. (b) Technology for monitoring the signaling traffic on the SS7, i.e., detecting a response message from dialed user's MSC propagating on the signaling channel. In either case, if an actual person answers the call, the RES is typically informed of it shortly after the occurrence. The signaling monitoring method typically enables a more robust detection as well as more precise information as to the reason call attempt has failed, which can be used for optimizing dialing schemes. This technique is taught in a co-pending U.S. application Ser. No. 12/839,211, filed on even-date herewith, entitled "Availability Notification System with Inter-Network Capabilities", which is hereby incorporated by reference in its entirety.

A possible feature in all re-establishment methods is that once a first user is waiting online, the RES configures the CallerID of the call initiated to the second user to be the number of the first party online Alternatively, an alphanumeric string can be used to indicate that this is a RES-initiated call. The CallerID displayed to second user (i.e., when first user is online) can be used an alphanumeric string or the first user's number. The advantage of these features is to provide users an easy interface for activating the triggering of the re-establishment task or for opting out even before answering the call.

In all embodiments of the present invention the re-established call, whether initiated by a user or by the RES, is established at user A's serving network as a new and independent call not associated in any way with the original call that disconnected. This means that no network resources associated with the original call have been preserved and utilized in the re-established call.

An advantageous feature in the present invention is conditioning the activation of the reconnection task on data representative of an approval from user A and/or user B. Querying a database storing such data can be performed before or after a detection task has been executed. The database can include a subscriber table storing subscriber data of users A and/or B.

Notably, the present invention can also be utilized to re-establish dropped calls that occur between wireline terminals and wireless terminals, whether the wireline terminal is user A or user B.

2) Detailed Discussion of Certain Components and Embodiments

The system for re-establishing dropped calls can be installed in a cellular network, e.g., as a dedicated server or as a module added to existing servers used for performing other tasks. For brevity, this system will be hereafter referred to as RES—Re-establishment System.

FIG. 2 provides a schematic description of the stages performed by the RES for each occurrence of a dropped call, according to the SMS-based embodiment. The sequence of steps is hereby elaborated.

According to the present invention, identification of dropped calls can be performed either by an external entity and then streamed to the RES system (step 212) and/or directly by the system itself (step 212), scanning a superset of terminated calls. At either case, the dropped call data such as users' number identities are input to the system.

Next, an SMS is sent to user B that user A is unavailable, offering the re-establishment service, and providing a method for expressing that he/she accepts the offer (step 214). This method can be, e.g., a reply SMS to the RES or a number to dial. Next, the RES detects whether user B has accepted the offer (step 216) and if yes, preferably acknowledges activation to user B via, e.g., an SMS or an incoming call. (step 218). Stages 214, 216, 218 are not mandatory as the call re-establishment system can be configured to function without them, i.e. trigger automatically at call drop. However, they are required if user B is to be given a one-by-one choice whether to re-establish the call. All non-mandatory steps will be represented hereinafter by rectangles with dotted circumferences, whereas mandatory steps will be represented hereinafter by rectangles with continuous circumferences.

Next, a notification is sent to user A (step 220), e.g., an SMS or any other message featuring an option of delivery report. This message has in fact two aims: first, it gives user A a reminder or notification to or return the call once he/she becomes available. Second, as this message is sent with a request for a delivery report, the message provides a mechanism for monitoring user A's availability. This means that the RES can be relieved of the availability monitoring function which is handed-out to an external system, such as an SMS server already configured to monitor users' availability for its own purposes. The system then reverts to idle mode (step 222) awaiting A's return to availability. Once user A is again available, he/she receives the SMS (step 224). The delivery report is handed back to the RES (step 224).

The advantage of handing-out the monitoring task to an external notification system (e.g. an SMS server) is twofold:

First, it enables offering the service in cases when user A is not a subscriber of the network in which the RES is installed. Second, it simplifies the system implementation substantially since it makes use of existing capabilities rather than adding dedicated availability monitoring modules.

Next, the RES triggers a notification to user B that user A is available (step 226). This stage completes the call re-establishment process since after its completion both users have been given an opportunity to reconnect. This stage is not mandatory as the system can theoretically rely on A to complete the re-establishment process. However, it is highly preferable for sparing user B of waiting for user A to call back, which might even not happen at all.

FIG. 3 provides a schematic description of the stages performed by the RES for each occurrence of a dropped call, according to the SMS-based embodiment with automatic triggering. The sequence of steps is hereby elaborated according to both figures. Users A and B are on a call (step 310) when the call is dropped in user A's network (step 312). User B then hangs up. Next, User B receives an SMS advising of the triggering of the availability notification service (non-mandatory step). Once user A returns to availability (step 318), he/she receives an SMS notifying him/her that it is now possible to return a call to user B (step 320). After a 30 seconds pause (step 322), user B receives an SMS advising that user A has become available (step 324). At this point, both users are notified that a call can be made and are at liberty to dial each other if so desired.

FIG. 4 provides a schematic description of the data flow between terminals and network entities according to the SMS-based embodiment with automatic triggering. User A's terminal is represented by vertical line 412, and so is user B's terminal (410). The switching entities MSC/SSP (Mobile Switching Center/Service Switching Point) in both A and B's serving networks are collectively represented by vertical line 414. The assumption behind this aggregation is that these entities communicate between themselves continuously and share all relevant data so that data arriving at one entity can be assumed to be present at the second within a short time. The Messaging Center (SMSC) is represented by a vertical line 418. Finally, the RES itself is represented by vertical line 420.

A call is in progress between users B and A (step 422) and is dropped in user A's serving network. The occurrence is notified to the MSC/SSP of user A's serving network (step 424) and then a report is sent from the MSC/SSP to the RES (step 426) with the following data: a call drop has occurred, which network dropped the call, B's number, A's number, and the time of the drop.

The RES then sends to messaging center at its network a request for sending a message MSG1 to user B (step 428), and MSG1 is sent to user B (step 430). Similarly, the RES sends Messaging center a request for sending a message MSG2 to user A, but this time with a delivery report request (step 432). A delivery report is a message sent back to a sender of a message acknowledging the delivery of the message to the recipient terminal. Since user A is unavailable, MSG2 can't be delivered to him/her and is stopped short of arriving at A's terminal (step 434).

At this point, the process pauses until user A returns to availability. When user A returns to availability after, e.g., an hour (436), he/she is delivered MSG2 that has awaited his return in his/her network's messaging center (step 438). A delivery acknowledgement of MSG2 is sent from A's terminal back to the messaging center (step 440), and then a delivery report of MSG2 is sent from the messaging center to the RES (step 442).

After a delay of 30 seconds, the RES sends to messaging center a request for sending a message MSG3 to user B (step 444), and MSG3 is sent with this delay from messaging center to user B (step 446). Thereafter, it is assumed that B is the first user to initiate a call to other user (either by pressing SEND twice or otherwise). A standard call request from B to the MSC/SSP (step 448) triggers ringing of A's terminal (step 450) and when A accepts the call (step 452) the call is reestablished (step 454). Steps 448,450,452 are not a part of the RES functionality but rather a typical sequence performed manually that occurs after the re-establishment task has terminated.

In the described embodiment, the stage of detecting the dropped calls and screening them from all other intentionally-disconnected calls is done at the MSC/SSP or at lower-level network modules (step 424). The call records received at the RES (step 426) are only of dropped calls. However, other methods may be applied for screening dropped calls. In one example, all terminated calls are streamed to the RES and the RES detects which of them are dropped calls. The latter method is superior to the former one in the aspect that it does not require changes to core network elements. However, the latter method is inferior to the former in the aspect that it requires hauling and processing of considerable amounts of data.

FIG. 5 provides a schematic description of the data flow between terminals and network entities identical to FIG. 4, with the only difference in the manual sequence that occurs following the termination of the re-establishment task. In this case, a standard call request from A to the MSC/SSP (step 510) triggers ringing of B's terminal (step 512) and when B accepts the call (step 514) the call is re-established (step 454).

FIG. 6 provides an elaborate description of the timeline occurrences according to the SMS-based embodiment with SMS triggering. The vertical axis (610) represents four states that a terminal can be in—unavailable (618), idle (i.e. available and not in use, 616), ringing state (614) and online (i.e. on an active call, 612). The horizontal axis (620) is a time axis. Terminal B is represented by a dotted line (630), and terminal A is represented by a continuous line (628). Users A and B are on a call when the call is dropped in user A's network. Both users then hang up, and the re-establishment task is triggered. Next, User B is sent an SMS advising of the triggering of the re-establishment service. The RES sends an SMS to user A (step 622) notifying him/her that it is now possible to return a call to user B. When user A returns to availability, he/she receives the SMS and the RES is delivered the SMS delivery report (step 632). Once the RES receives the delivery report of the SMS, it sends an SMS to user B (step 634) notifying user B that user A is now available. Shortly thereafter, user B receives the SMS. At this point, both users are notified that a call can be made and are at liberty to dial each other if so desired.

FIG. 7 provides a schematic description of the stages performed by the RES for each occurrence of a dropped call according to the HLR-based Re-establishment (simultaneous ring) embodiment with automatic triggering. The various steps are hereby elaborated. Dropped calls can be identified within the RES (step 710) and/or streamed from external module/s (712). Obtaining dropped call data from external modules can be performed similarly to what has been described in FIG. 2.

Monitoring availability of both users (step 714) can be performed in one of several ways described in the background. Querying the HLR registration can only be used in cases when the RES is enabled access to both users' HLR's.

This may happen e.g., if both users are of the same RES-installed network, or if two RES-enabled networks are cooperating for that purpose.

When both users are determined available simultaneously, two system calls are initiated from the RES to the users (step 716). The first user that answers is played an audio message: "Please remain online to be reconnected", and can then hear other user's ringback tone. (step 718).

Once second user answers the terminal, the system connects users, e.g., as in a "conference call" with three users (two users and RES), and then preferably performs a "call dropback" in order to leave only the two users online (step 720).

FIG. 8 provides an elaborate description of the users' perspective for each occurrence of a dropped call according to the HLR-based Re-establishment embodiment with automatic triggering (simultaneous ring) of the present invention. The sequence of steps is hereby elaborated.

Users B and A are talking using cellular terminals (step 800), when the call is dropped in A's serving network, i.e., A is disconnected from his/her serving network (step 802). User B hangs up the call (step 804). After some time has passed, A returns to availability (step 806) and the code used by the system makes an assumption that B is still available (if not, the system waits for the first time both users are available). Then, both users are rung simultaneously (step 808).

If (condition 810) A has answered first, A hears a message "Please remain online for call reconnection attempt" (step 830). If (condition 832) A does not remain online, the process is terminated (step 840). If A remains online, A hears B's terminal ringing (step 834). Then if (condition 836) B answers, system reconnects users B and A (step 838). If not, process is terminated (step 840).

If (condition 810) A has not answered first, then if (condition 812) B has not answered first it means that neither user has answered and then the process terminates (step 814). If (condition 812) B has answered first, B hears a message "Please remain online for reconnection attempt" (step 816). If (condition 818) B does not remains online process is terminated (step 828). If B remains online B hears A's terminal ringing (step 820). Then if (condition 824) A answers, system reconnects users B and A (step 826). If not, process is terminated (step 828).

Such conditions can be processed by code executing in at least one module or in a hardware component connected to the telephony system and constructed in accordance with the invention that implements the logical tests and initiates actions or further tests in response to the results.

FIG. 9 provides a timeline perspective of one (desired) scenario according to the description is FIG. 8. The numbering used for each event in this figure corresponds to the numbering in FIG. 8.

FIG. 10 provides a schematic description of the signaling traffic involved in the process of connecting users A and B following a dropped call according to the HLR-based embodiment with automatic triggering (simultaneous ring).

User A's terminal is represented by vertical line 1010, and so is user B's terminal (1012). The switching entities MSC/SSP (Mobile Switching Center/Service Switching Point) in both A and B's serving networks are collectively represented by vertical line 1014. The assumption behind this aggregation is that these entities communicate between themselves continuously and share all relevant data so that data arriving at one entity can be assumed to be present at the second within a short time. The HLR (Home Location Registry) is represented by vertical line 1016. Finally, the RES itself is represented by vertical line 1018.

Users A and B are on a call (step 1020) when the call is dropped on A's serving network. The occurrence is notified to the MSC/SSP of user A's serving network (step 1022) and then a report is sent from the MSC/SSP to the RES (step 1024) with the following data: a call drop has occurred, which serving network dropped the call, A's number, B's number, and the time of the drop.

The RES then queries the HLR for A's availability (step 1026), and receives a negative response (step 1028). A query is sent again (step 1030) and receives again a negative response (step 1032). Thereafter, querying the HLR is performed in decreasing frequency. After an hour passes, A becomes available (step 1033). The next availability query on A (step 1034) receives a positive response (step 1036), and then an availability query is performed for B (step 1038).

Such queries can be initiated by code executing in at least one module or in a hardware component connected to the telephony system and constructed in accordance with the invention that takes actions in response to its execution.

Assuming B too is determined available (step 1040), simultaneous calls are initiated from the RES to both A (step 1042) and B (step 1044). B's and A's terminals start to ring at whichever order (steps 1046 and 1048 respectively), and B happens to be the one to answer first (step 1050). A report is passed to the RES that B has answered the terminal (step 1052) and then the RES (online with B) plays a message to B: "Please remain online to be reconnected with A" (step 1054). When B remains online he/she hears A's terminal ringing, A answers the call (step 1056) and a report is sent to the RES (step 1058).

The RES then bridges A and B, e.g., as in a "conference call" with three parties (two users and RES, step 1060), and then preferably performs a "call dropback" in order to leave only A and B online (step 1062).

FIG. 11 provides a schematic description of the stages performed by the RES for each occurrence of a dropped call according to the HLR-based Re-establishment (one-ring-at-a-time). The embodiment described in FIG. 11 is similar to the embodiment described in FIG. 7, with the only difference that instead of dialing both users simultaneously, user B is dialed first and then only if he/she answers and remains online, user A is automatically dialed. If user B doesn't answer, he/she is retried once more after e.g. 5 minutes and if this attempt too fails task is aborted.

FIG. 12 provides an elaborate description of the users' perspective for each occurrence of a dropped call according to the HLR-based Re-establishment embodiment with automatic triggering (one-ring-at-a-time) of the present invention. The format of this figure is similar to the format of FIG. 8 with applicable changes.

FIG. 13 provides a timeline perspective of one (desired) scenario according to the description is FIG. 12. The numbering used for each event in this figure corresponds to the numbering in FIG. 12.

FIG. 14 provides a schematic description of the signaling traffic involved in the process of connecting users A and B following a dropped call according to the HLR-based embodiment with automatic triggering (one-ring-at-a-time).

FIG. 15 provides a schematic description of the stages performed by the RES for each occurrence of a dropped call according to the Ring-based embodiment with automatic triggering. The various steps are hereby elaborated. Dropped calls can be identified within the RES (step 1510) and/or streamed from external module/s (step 1512). Obtaining dropped call data from external modules can be performed similarly to what has been described in FIG. 2. Once detecting a dropped call, the RES automatically dials to user A (step

1514). If user A is unavailable, the RES pauses and then redials again (step 1516). This is performed for a period of time T (e.g., 10-40 seconds) and if A is unavailable for this time (or available but not answering) the task aborts. If A does answer, the RES sounds an audio message "please remain online to be reconnected" (step 1520). If user A remains online, the RES rings user B (step 1522) and when user B answers, the system connects users, e.g., as in a "conference call" with three users (two users and RES), and then preferably performs a "call dropback" in order to leave only the two users online (step 1524).

FIG. 16 provides an elaborate description of the users' perspective when reconnecting users B and A after their call has dropped, according to the Redial-based Re-establishment with Automatic Triggering embodiment of the present invention.

Users B and A are talking using cellular terminals (step 1610), when the call is dropped on A's serving network (step 1612). Shortly after, user B hangs up the call (step 1614). If user A turns available within a predefined period, e.g. 20-60 seconds (condition 1616), user A is rung (step 1618). If user A fails to answer (condition 1620), the re-establishment task aborts. If user A does answer, he/she hears a message "Please remain online to be reconnected" (step 1622). If (condition 1624) user A does not remains online the re-establishment task is aborted. If A does he/she hears B's terminal ringback one (step 1626). Then if (condition 1628) B answers, system re-establishes a call between users B and A (step 1630). If B does not answer, the re-establishment task aborts.

Such conditions can be processed by code executing in at least one module or in a hardware component connected to the telephony system and constructed in accordance with the invention that implements the logical tests and initiates actions or further tests in response to the results.

FIG. 17 provides a timeline perspective of one (desired) scenario according to the description in FIG. 16. The numbering used for each event in this figure corresponds to the numbering in FIG. 16.

FIG. 18 provides a schematic description of the signaling traffic involved in the process of connecting users A and B following a dropped call according to the Redial-based Re-establishment with Automatic Triggering embodiment of the present invention.

Users A and B are on a call (step 1800) when the call is dropped on A's serving network. The occurrence is notified to the MSC/SSP of user B's serving network (step 1802) and then a report is sent from the MSC/SSP to the RES (step 1804) with the following data: a call drop has occurred, which serving network dropped the call, A's number, B's number, and the time of the drop.

The RES then attempts to set up a call with user A. A first call setup attempt (step 1806) fails when the MSC cannot reach terminal A (step 1808) and a report is sent back to the RES (step 1810). A second call setup attempt to A (step 1812) succeeds and a call request is forwarded to user A's terminal (step 1814). When user A answers a report goes out to the MSC (step 1816), which sends a further report to the RES (step 1818). The RES then sounds on the audio channel a message to user A: "Please remain online for re-establishing dropped call" (step 1820). If no termination report is received within 3 seconds, the RES sends a call setup attempt to user B (step 1828). B is rung (step 1830), answers the call (step 1832), and a report is sent to the RES that B is online (step 1836).

The RES then bridges A and B, e.g., as in a "conference call" with three parties (two users and RES, step 1838), and then preferably performs a "call dropback" in order to leave only A and B online (step 1840).

It should be noted that this embodiment is very convenient, since no means are required to assess the availability of A other than repeated redialing and that can of course be performed both in inter-network conditions (when A is in the same network as the RES) and in inter-network conditions (when A is in a different network than the RES). The only limitation is that this process is effective only for short periods (e.g. up to 20-60 seconds), because otherwise it would impose a heavy load on the system. Having that in view, it would be most preferable to combine this embodiment with parts of the other embodiments described above. Such combination is most preferable, since it covers both short-duration and long-duration call drops.

Nevertheless, in certain special cases, the redial based embodiment may be a stand-alone method and the redialing period could be extended for a longer period. This could apply for a small fraction of the dropped calls, such as in the case of dropped emergency calls or premium-service ("VIP") calls. In this respect, one could apply the teachings of US Patent Application 20070121852 to Taylor et al. titled "Method and System for User Prioritization within Telecommunication Services and in Particular within Call Completion Services", which is incorporated by reference in its entirety. In US Patent Application 20070121852, a concept is suggested for prioritizing subscribers in telecommunication systems by providing these subscribers preferred allocation of network resources. Various criteria of prioritization could apply, including the ones mentioned above.

FIG. 19 provides a timeline perspective of a combined embodiment, in which first a redial-based re-establishment task (automatically triggered) is tried, and when unsuccessful, an HLR-based re-establishment is automatically triggered. After the call drops three dial attempt are made by the RES (T3,T4,T5) which turn out to be futile and then the redial-based re-establishment task is aborted. Thereafter, the HLR-based re-establishment task is automatically triggered and once user A turns available, the RES brings user B online (T9) and then user A online (T12) and re-establishes the call.

FIG. 20 provides a timeline perspective of a combined embodiment, in which first a reconnection embodiment as taught in a co-pending U.S. application Ser. No. 12/839,161 filed on even-date herewith, entitled "Dropped Call Reconnection System with Inter-Network Capabilities," and which is hereby incorporated by reference as if set forth in its entirety herein, is tried, and when unsuccessful, a the HLR-based re-establishment task according to the present invention is automatically triggered.

After a call drops on user A (V1), the reconnection embodiment according to the aforesaid co-pending U.S. Application entitled "Dropped Call Reconnection System with Inter-Network Capabilities" is triggered. User B is immediately sounded a message advising him/her to remain online for a reconnection attempt (V2). After user B remains online (V3), two consecutive call are automatically initiated to user A (V4,V5) which turn out to be futile. Once the second call attempt fails, user B is sounded a message "reconnection attempt failed. Please hang up and you will be notified once user A returns to availability." (V7). Thereafter, the HLR-based re-establishment task according to the present invention is automatically triggered: user A's availability is monitored and once he/she turns available (V8) and detected as such (V9), the RES rings user B (V10). Once user B answers, he/she is requested to remain online (V11). If user B remains online (V12) user A is called (V13) and when user A answers (V14), the call is re-established and users A and B can resume their conversation.

While the invention has been described in connection with a certain embodiment thereof, the invention is not limited to the described embodiments but rather is more broadly defined by the recitations in the claims below and equivalents thereof.

We claim:

1. A method for re-establishing an unintentionally-disconnected call in a communication system, the disconnection being a result of a loss of one of a plurality of connections that constitute the call, comprising the steps of:
   a. performing a call teardown procedure which releases resources of the communication system that were being used for the unintentionally-disconnected call;
   b. detecting that one connection of the call has been unintentionally-disconnected using a re-establishment system (RES) connected to a network associated with at least one of the parties to the call, the RES having a detection task module executing at least one detection task on a processor thereof and operative to:
      1. receive the number identifications of the two parties;
      2. receive a release message associated with the call, said release message originating in an MSC of the network that initiated the call termination, the release message including one or more cause-indicators; and
      3. test the cause-indicator in the received release message in a machine executing the RES to determine a match to a prescribed criterion; and
   c. in the event of the match, executing a re-establishment task within the RES using a re-establishment task module;
      wherein the re-establishment task executes to dial user A, who is the party that has been unintentionally disconnected from the network, and to keep redialing for a predefined time limit until user A answers;
      wherein, if user A answers within the predefined time limit, then the re-establishment task performs the additional steps at the RES of:
      dialing user B, who is the other party to the call, and
      if user B answers, bridging user A and user B.

2. A method as in claim 1, wherein the step of executing the re-establishment task is performed on the condition that the RES has access to an approval from at least one of user A and user B to execute the re-establishment task.

3. A method as in claim 2, including the additional step of storing the approval prior to the disconnection.

4. A method as in claim 1, including the additional step of providing a task manager configured to monitor each detection task and re-establishment task that is executing within the RES.

5. A method as in claim 1, wherein user A and user B are subscribers to the same network.

6. A method as in claim 1 wherein user A and user B are subscribers of different networks.

7. A method as in claim 1, including the additional step, after passage of the predefined time limit free of user A answering the call, of:
   a. executing a call re-establishment task of a second type within the RES using the a re-establishment task module of a second type,
      wherein the re-establishment task of the second type operates so as to periodically assess the availability of user A using data provided over the network for a second predefined time limit until user A becomes available;
      wherein, if user A becomes available within the predefined time limit, the re-establishment task of the second type performs the additional step at the RES of sending at least one of user A and a user B, who is the other party to the call, a notification that a new call can be established.

8. A method as in claim 7, wherein the step of executing the re-establishment task of the second type is performed on the condition that the RES has access to an approval from at least one of user A and user B to execute the re-establishment task of the second type.

9. A method as in claim 8, including the additional step of storing the approval prior to the disconnection.

10. A method as in claim 7, wherein assessing the availability of user A is performed by querying an HLR of a network serving user A.

11. A method as in claim 7 wherein assessing the availability of user A is performed by sending a message to user A and receiving an acknowledgement thereof.

12. A method as in claim 11, wherein the message is stopped short of reaching user A's terminal.

13. A method for re-establishing an unintentionally-disconnected call in a communication system, the disconnection being a result of a loss of one of a plurality of connections that constitute the call, comprising the steps of:
   a. performing a call teardown procedure which releases resources of the communication system that were being used for the unintentionally-disconnected call;
   b. detecting that one connection of the call has been unintentionally-disconnected using a re-establishment system (RES) connected to a network associated with at least one of the parties to the call, the RES having a detection task module executing a detection task on a processor thereof and operative to:
      1. receive the number identifications of the two parties;
      2. receive a release message associated with the call, said release message originating in an MSC of the network that dropped the call, the release message including one or more cause-indicators; and
      3. test the cause-indicator in the received release message in a machine executing the RES to determine a match to a prescribed criterion; and
   c. in the event of the match, executing a re-establishment task within the RES using a re-establishment task module;
      wherein the re-establishment task operates so as to periodically assess the availability of a user A, who is the party that has been unintentionally disconnected from the network, using data provided over the network for a predefined time limit until user A becomes available, and
      wherein, if user A becomes available within the predefined time limit, the re-establishment task performs the additional step at the RES of sending at least one of user A and a user B, who is the other party to the call, a notification that a new call can be established.

14. A re-establishment system (RES) for re-establishing a call between a user A who has been unintentionally-disconnected from a communication network and a user B who is the other party to the call, the disconnection being a result of a loss of at least one of a plurality of connections between user A and user B which together constitute the call, wherein the RES is connected to the communication network and is associated with at least one of user A and user B, comprising:
   (a) a computer having a memory and a processor for executing modules therein, the computer being in communication with the communication network;

(b) a database;
(c) a detection task module loaded into the memory of the computer and executing at least one detection task in the processor, the detection task configuring the processor to cause the computer to:
  1. load into the memory number identifications of user A and user B which are provided by the communication network;
  2. load into the memory a release message associated with the call which is provided by the communication network, the release message including one or more cause-indicators; and
  3. test the cause-indicator in the received release message in a machine executing the RES to determine a match to a prescribed criterion;
(d) a re-establishment task module loaded into the memory of the computer and executing at least one re-establishment task in the processor in response to the test by the detection task returning the match, the re-establishment task configuring the processor to cause the computer to:
  i. Dial user A;
  ii. monitor whether user A answers the call based on data provided by the communication network; and
  iii. if user A answers within a predefined time limit, then
    1. dialing user B; and
    2. if user B answers, bridging user A and user B.
  otherwise, repeating (d)(i), (d)(ii), (d)(iii) until the predetermined time limit has lapsed; and
(e) a task manager loaded into the memory of the computer and executing in the processor so as to configure the processor to monitor the execution of up to a multiplicity of detection tasks and re-establishment tasks,
wherein the re-establishment task module executes free of any intervention or suspension of a call teardown procedure to release resources of the communication system that were being used for the unintentionally-disconnected call.

15. A system as in claim 14, wherein the task manager further configures the processor to launch the re-establishment task on the condition that the RES has access to data representative of an approval from at least one of user A and user B to execute the re-establishment task.

16. A system as in claim 15, wherein the task manager tests whether the database contains data representative of the approval of at least one of user A and user B prior to the detection task being executed.

17. A system as in claim 14, wherein the database includes a subscriber table and wherein at least one of user A and user B have subscriber data stored in the subscriber table.

18. A system as in claim 14, wherein the RES is part of a conference call with user B and wherein the call re-establishment task of the second type further configures the processor to cause the computer to announce that the re-establishment is feasible using the portion of the set of resources that has been preserved from the call.

19. A system as in claim 14, wherein the switching network associated with at least one of user A and user B is a mobile switching center.

20. A system as in claim 14, wherein the re-establishment task further configures the processor, after passage of the predefined time limit free of user A answering the call, to cause the computer to:
  a. execute a call re-establishment task of a second type within the RES,
    wherein the re-establishment task of the second type operates so as to periodically assess the availability of user A using data provided over the communication network for a predefined time limit until user A becomes available; and
  wherein if user A becomes available within the predefined time limit, the re-establishment task of the second type is further operative to send at least one of user A and user B a notification that the call can be re-established.

21. A system as in claim 20, wherein the task manager further configures the processor to launch the re-establishment task on the condition that the RES has access to data representative of an approval from at least one of user A and user B to execute the re-establishment task.

22. A system as in claim 21, wherein the task manager tests whether the database contains data representative of the approval of at least one of user A and user B prior to the detection task being executed.

23. A system as in claim 20, wherein assessing the availability of user A is performed by querying an HLR of a network serving user A.

24. A system as in claim 20, wherein assessing the availability of user A is performed by sending a message to user A and receiving an acknowledgement thereof.

25. A method as in claim 20, wherein the message is stopped short of reaching user A's terminal.

26. A re-establishment system (RES) for re-establishing a call between a user A who has been unintentionally-disconnected from a communication network and a user B who is the other party to the call, the disconnection being a result of a loss of at least one of a plurality of connections between user A and user B which together constitute the call, wherein the RES is connected to the communication network and is associated with at least one of user A and user B, comprising:
  (a) a computer having a memory and a processor for executing modules therein, the computer being in communication with the communication network;
  (b) a database;
  (c) a detection task module loaded into the memory of the computer and executing at least one detection task in the processor, the detection task configuring the processor to cause the computer to:
    1. load into the memory number identifications of user A and user B which are provided by the communication network;
    2. load into the memory a release message associated with the call which is provided by the communication network, the release message including one or more cause-indicators; and
    3. test the cause-indicator in the received release message in a machine executing the RES to determine a match to a prescribed criterion;
  (d) a re-establishment task module loaded into the memory of the computer and executing at least one re-establishment task in the processor in response to the test by the detection task returning the match, the re-establishment task configuring the processor to cause the computer to:
    periodically assess the availability of user A using data provided over the communication network for a predefined time limit until user A becomes available;
    wherein if user A becomes available within the predefined time limit, the re-establishment task is further operative to send at least one of user A and user B a notification that the call can be re-established;
  (e) a task manager loaded into the memory of the computer and executing in the processor so as to configure the processor to monitor the execution of up to a multiplicity of detection tasks and re-establishment tasks, wherein the re-establishment task module executes free of any intervention or suspension of a call teardown procedure to release resources of the communication system that were being used for the unintentionally-disconnected call.

27. A system as in claim 14, further comprising a re-establishment task module of a second type loaded into the memory of the computer and executing at least one call re-establishment task of a second type in the processor after passage of the predefined time limit free of user A answering the call, the call re-establishment task of the second type configuring the processor to periodically assess the availability of user A using data provided over the network for a second predefined time limit until user A becomes available, wherein, if user A becomes available within the predefined time limit, the re-establishment task of the second type is further configured to cause the RES to send at least one of user A and a user B, who is the other party to the call, a notification that a new call can be established.

* * * * *